United States Patent
Jerabek et al.

(10) Patent No.: US 11,584,834 B2
(45) Date of Patent: Feb. 21, 2023

(54) FIBER REINFORCED POLYPROPYLENE COMPOSITIONS

(71) Applicant: BOREALIS AG, Vienna (AT)

(72) Inventors: Michael Jerabek, Linz (AT); Wolfgang Stockreiter, Linz (AT); Thomas Lummerstorfer, Linz (AT)

(73) Assignee: BOREALIS AG, Vienna (AT)

( * ) Notice: Subject to any disclaimer, the term of this patent is extended or adjusted under 35 U.S.C. 154(b) by 258 days.

(21) Appl. No.: 16/765,418

(22) PCT Filed: Dec. 4, 2018

(86) PCT No.: PCT/EP2018/083397
§ 371 (c)(1),
(2) Date: May 19, 2020

(87) PCT Pub. No.: WO2019/110536
PCT Pub. Date: Jun. 13, 2019

(65) Prior Publication Data
US 2020/0332076 A1    Oct. 22, 2020

(30) Foreign Application Priority Data
Dec. 5, 2017 (EP) ..................... 17205452

(51) Int. Cl.
C08K 7/14 (2006.01)
C08L 23/08 (2006.01)
C08L 23/12 (2006.01)
C08J 5/04 (2006.01)

(52) U.S. Cl.
CPC ........... *C08J 5/043* (2013.01); *C08J 2323/08* (2013.01); *C08J 2323/12* (2013.01); *C08K 7/14* (2013.01); *C08L 23/0815* (2013.01); *C08L 23/12* (2013.01)

(58) Field of Classification Search
None
See application file for complete search history.

(56) References Cited

U.S. PATENT DOCUMENTS

| | | | |
|---|---|---|---|
| 4,506,056 A | 3/1985 | Gaylord | |
| 4,753,997 A | 6/1988 | Shyu et al. | |
| 5,272,236 A | 12/1993 | Lai et al. | |
| 2012/0225993 A1* | 9/2012 | Bernreitner | C08L 23/10 524/517 |
| 2014/0073731 A1* | 3/2014 | Inamdar | C08L 23/10 524/528 |
| 2015/0252179 A1 | 9/2015 | Kwon et al. | |

FOREIGN PATENT DOCUMENTS

| | | |
|---|---|---|
| CN | 101568576 A | 10/2009 |
| CN | 102575073 A | 7/2012 |
| CN | 103012960 A | 4/2013 |
| CN | 104204070 A | 12/2014 |
| CN | 104812830 A | 7/2015 |
| CN | 104893092 A | 9/2015 |
| CN | 105153549 A | 12/2015 |
| CN | 105339425 A | 2/2016 |
| CN | 105392835 A | 3/2016 |
| CN | 107001741 A | 8/2017 |
| EP | 0404303 A1 | 12/1990 |
| EP | 0887379 A1 | 12/1998 |
| EP | 0887380 A1 | 12/1998 |
| EP | 0887381 A1 | 12/1998 |
| EP | 0991684 B1 | 1/2006 |
| EP | 2308923 A1 | 4/2011 |
| EP | 1805238 B1 | 5/2011 |
| EP | 2092015 B1 | 11/2012 |
| EP | 2610271 A1 | 7/2013 |
| EP | 2610272 A1 | 7/2013 |
| EP | 3112417 A1 | 1/2017 |
| EP | 3118249 A1 | 1/2017 |
| JP | 2010513635 A | 4/2010 |
| JP | 2012158648 A | 8/2012 |
| JP | 2014208807 A | 11/2014 |
| JP | 2016183279 A | 10/2016 |
| WO | 9212182 A1 | 7/1992 |
| WO | 9924478 A1 | 5/1999 |
| WO | 9924479 A1 | 5/1999 |
| WO | 0068315 A1 | 11/2000 |
| WO | 2004000899 A1 | 12/2003 |
| WO | 2004111095 A1 | 12/2004 |
| WO | 2008074713 A1 | 6/2008 |
| WO | 2012007430 A1 | 7/2011 |
| WO | 2014182921 A1 | 11/2014 |
| WO | 2016101139 A1 | 6/2016 |
| WO | 2016188887 A1 | 12/2016 |

OTHER PUBLICATIONS

Johns Manville, Product data sheet for ThermoFlow 738, Aug. 2020. (Year: 2020).*
Product Data Sheet for ExxonMobil Exxelor PO 1020. Dec. 20, 2012. (Year: 2012).*
Japanese Patent Application No. 2020-527877; Japanese Office Action dated Jun. 29, 2021; 17 pgs.
Applicant: Borealis AG; Korean Patent Application No. 10-2020-70144286; Fiber Reinforced Polypropylene Composition; Korean Office Action dated Jul. 14, 2021; 12 pgs.
Applicant Borealis AG; "Fiber Reinforced Polypropylene Composition"; Chinese Application No. 201880074610.2 Chinese Office Action dated Mar. 3, 2022; 18 pp.

(Continued)

*Primary Examiner* — Richard A Huhn
(74) *Attorney, Agent, or Firm* — Tarolli, Sundheim, Covell & Tummino LLP

(57) ABSTRACT

The present invention is directed to granules comprising a fiber reinforced composition (C), said composition comprising a propylene polymer (PP), an elastomeric ethylene copolymer (E) and short fibers (SF). Further, the present invention is directed to an article comprising said fiber reinforced composition (C).

14 Claims, No Drawings

(56) References Cited

OTHER PUBLICATIONS

Applicant: Borealis AG; "Fiber Reinforced Polypropylene Composition"; European Patent Application No. 17205452.0; Notice of Opposition dated Nov. 2, 2021; 26 pgs.
Dow; Engage 7447 Polyolefin Elastomer; Trademark of the Dow Chemical Company; Form No. 400-00097107en; Nov. 7, 2006; 2 pgs.; www.dowplastics.com.
Polybond 3200 Polymer Modifier; Technical Information; Addivant Solutions to Breakthrough; Technical Information Effective Apr. 1, 2013; 1 pg.; www.addivant.com.
Karger-Kocsis, J., & Bárány, T.; "Polypropylene Handbook, Morphology, Blends and Composites"; Springer; (Eds.). (2019). Polypropylene Handbook. doi:10.1007/978-3-030-12903-3; 6 pgs.
Harutun G. Karian; Handbook of Polypropylene and Polypropylene Composites, Second Edition, Revised and Expanded; Copyright 2003 by Marcel Dekker, Inc.; 8 pgs.
E.M. Abdel-Bary; Handbook of Plastic Films; Rapra Technology Limited; http://www.rapra.net; 3 pgs., 2003.
John Moalli; Plastic Failure, Analysis and Prevention; Plastics Design Library; 2001; 7 pgs.
S. Shahid, et al.; "Comparison of Rheological and Mechanical Properties of Modified Polypropylene—Short Glass Fiber Composites"; The Nucleus, 46 (4) 2009: 459-464; Oct. 29, 2009; 6 pgs.
Markus Gahleitner, et al.; Heterophasic Copolymers of Polypropylene: Development, Design Principles, and Future Challenges; Journal of Applied Polymer Science; Apr. 26, 2013; 10 pgs.; DOI:10.1002/app.39626.
Cheng, "13C NMR Analysis of Ethylene-propylene Rubbers" Macromolecules 1984, 17, 1950-1955.
Busico, et al. "Full Assignment of the 13C NMR Spectra of Regioregular Polypropylenes: Methyl and Methylene Region" Macromolecules 1997, 30, 6251-6263.
Busico, et al. "Alk-1-ene Polymerization in the Presence of a Monocyclopentadienyl Zirconium(IV) Acetamidinate Catalyst: Microstructural and Mechanistic Insights" Macromol. Rapid Commun. 2007, 28, 1128-1134.
Busico, et al. "Microstructure of polypropylene" Prog. Polym. Sci. 26 (2001) 443-533.
Brandrup, et al. "Polymer Handbook: Fourth Edition", 1999.
Kakugo, et al. "13C NMR Determination of Monomer Sequence Distribution in Ethylene-propylene Copolymers Prepared with 8-TICI3-A1(C2H5)2C1" Macromolecules 1982, 15, 1150-1152.
Zweifel, "Plastic Additives Handbook" 6th Edition, 2009.
Wang, et al., "Structural Analysis of Ethylene/Propylene Copolymers Synthesized with a Constrained Geometry Catalyst" Macromolecules 2000, 33, 1157-1162.
Singh, et al., "Triad sequence determination of ethylene-propylene copolymers—application of quantitative 13C NMR" Polymer Testing 28 (2009) 475-479.
Resconi, et al., "Selectivity in Propene Polymerization with Metallocene Catalysts" Chem. Rev. 2000, 100, 1253-1345.
Zhou, et al., "A new decoupling method for accurate quantification of polyethylene copolymer composition and triad sequence distribution with 13C NMR" Journal of Magnetic Resonance 187 (2007) 225-233.
Zweifel "Plastic Additives Handbook" 2001.
International Search Report for PCT/EP2018/083397 dated Feb. 14, 2019.

* cited by examiner

FIBER REINFORCED POLYPROPYLENE COMPOSITIONS

The present invention is directed to granules comprising a fiber reinforced composition (C), said composition comprising a propylene polymer (PP), an elastomeric ethylene copolymer (E) and short fibers (SF). Further, the present invention is directed to an article comprising said fiber reinforced composition (C).

The mechanical performance of fiber reinforced polypropylene compositions, especially the stiffness and strength, is typically adjusted with the fiber content. In particular, increasing the fiber content leads to an increase of stiffness and strength. The addition of fibers to a polypropylene composition also leads to an improved notched impact and puncture performance. In such compositions, however, the impact behavior is fully controlled by the fiber content whereupon further improving the impact performance of fiber reinforced polypropylene compositions is challenging.

The most obvious approach for making fiber reinforced polypropylene composition tougher is to add elastomeric components in high amounts. The disadvantage of this approach is the significant decrease of stiffness and strength.

Accordingly, there is a need in the art for a fiber reinforced polypropylene composition featured by an excellent impact performance and high stiffness.

Therefore, it is an object of the present invention to provide a fiber reinforced polypropylene composition featured by an improved notched impact and puncture performance without compromising the tensile properties.

The finding of the present invention is to provide a fiber reinforced composition comprising a low amount of elastomer.

Thus, the present invention is directed to granules comprising a fiber reinforced composition (C), comprising
i) a propylene polymer (PP) having a melt flow rate $MFR_2$ (230° C., 2.16 kg) determined according to ISO 1133 in the range of 10.0 to 250.0 g/10 min,
ii) an elastomeric ethylene copolymer (E) being a copolymer of ethylene and a $C_4$-$C_{10}$ α-olefin,
iii) an adhesion promoter (AP), and
iv) short fibers (SF) selected from the group consisting of glass fibers, metal fibers, ceramic fibers, carbon fibers and graphite fibers, wherein said fiber reinforced composition (C) fulfils in-equation (I)

$$\frac{w(PP)}{w(E)} > 2.0, \qquad (I)$$

wherein w(PP) is the weight fraction [in wt.-%] of the propylene polymer (PP), based on the overall weight of the polypropylene composition (C), and w(E) is the weight fraction [in wt.-%] of the elastomeric ethylene copolymer (E), based on the overall weight of the fiber reinforced composition (C).

According to one embodiment of the present invention, the fiber reinforced composition (C) fulfils in-equation (II)

$$\frac{w(SF)}{w(E)} > 3.3, \qquad (II)$$

wherein w(SF) is the weight fraction [in wt.-%] of the short fibers (SF), based on the overall weight of the polypropylene composition (C), and w(E) is the weight fraction [in wt.-%] of the elastomeric ethylene copolymer (E), based on the overall weight of the fiber reinforced composition (C).

According to a further embodiment of the present invention, the fiber reinforced composition (C) has a melt flow rate $MFR_2$ (230° C., 2.16 kg) determined according to ISO 1133 below 100.0 g/10 min.

According to one embodiment of the present invention, the fiber reinforced composition (C) comprises
i) 20.0 to 70.0 wt.-% of the propylene polymer (PP),
ii) 2.0 to 12.0 wt.-% of the elastomeric ethylene copolymer (E),
iii) 0.1 to 5.0 wt.-% of the adhesion promoter (AP), and
iv) 10.0 to 70.0 wt.-% of the short fibers (SF),
based on the overall weight of the fiber reinforced composition (C).

According to another embodiment of the present invention, the adhesion promoter (AP) is a polar modified polypropylene (PM-PP) being a propylene homo- or copolymer grafted with maleic anhydride having a melt flow rate MFR (190° C., 2.16 kg) determined according to ISO 1133 of at least 50.0 g/10 min.

According to still another embodiment of the present invention, the elastomeric ethylene copolymer (E) has a melt flow rate MFR (190° C., 2.16 kg) determined according to ISO 1133 of at least 25.0 g/10 min.

According to a further embodiment of the present invention, the elastomeric ethylene copolymer (E) has
a) a comonomer content of 2.0 to 25.0 mol-%, and/or
b) a density below 0.900 g/cm$^3$.

It is especially preferred that the elastomeric ethylene copolymer (E) is a copolymer of ethylene and 1-octene.

According to one embodiment of the present invention, the propylene polymer (PP) is a propylene homopolymer.

According to another embodiment of the present invention, the propylene polymer (PP) is at least bimodal.

It is especially preferred that the propylene polymer (PP) comprises
i) 10.0 to 35.0 wt.-% of a first propylene polymer (PP1),
ii) 30.0 to 70.0 wt.-% of a second propylene polymer (PP2), and
iii) 10.0 to 35.0 wt.-% of a third propylene polymer (PP3),
based on the overall weight of the propylene polymer (PP), wherein said first propylene polymer (PP1), said second propylene polymer (PP2) and said third propylene polymer (PP3) have different melt flow rates $MFR_2$ (230° C., 2.16 kg) determined according to ISO 1133.

According to a further embodiment of the present invention, the short fibers (SF) are glass fibers.

It is especially preferred that the short fibers (SF), preferably short glass fibers (SGF) have
i) an average length of 1.0 to 10.0 mm, and/or
ii) an average diameter of 8 to 20 m.

According to another embodiment of the present invention, the granules comprise at least 80.0 wt.-% of the fiber reinforced polypropylene composition (C), based on the overall weight of the granules.

The present invention is further directed to an article comprising the fiber reinforced polypropylene composition (C) as described above.

Preferably, said article is a moulded article.

In the following the present invention is described in more detail.

The Fiber Reinforced Polypropylene Composition (C)

As outlined above, the present invention is directed to granules comprising a fiber reinforced polypropylene composition (C).

According to a preferred embodiment of the present invention, the granules comprise at least 80.0 wt.-%, more preferably at least 90.0 wt.-%, still more preferably at least 95.0 wt.-%, like at least 99.0 wt.-% of the fiber reinforced polypropylene composition (C), based on the overall weight of the granules. It is especially preferred that the granules consist of the fiber reinforced composition (C).

As mentioned above said fiber reinforced polypropylene composition (C) comprises a propylene polymer (PP), an elastomeric ethylene copolymer (E), an adhesion promoter (AP) and short fibers (SF). In a preferred embodiment the propylene polymer (PP), the elastomeric ethylene copolymer (E), the adhesion promoter (AP) and the short fibers (SF) make up the main part of the fiber reinforced polypropylene composition (C). That is in one preferred embodiment the fiber reinforced polypropylene composition (C) comprises the propylene polymer (PP), the elastomeric ethylene copolymer (E), the adhesion promoter (AP) and the short fibers (SF), wherein the propylene polymer (PP), the elastomeric ethylene copolymer (E) and the adhesion promoter (AP) are the main polymer components in the fiber reinforced polypropylene composition (C), i.e. the fiber reinforced polypropylene composition (C) does not contain more than 10 wt.-%, preferably not more than 5 wt.-%, based on the total amount the fiber reinforced polypropylene composition (C), of polymers other than the propylene polymer (PP), the elastomeric ethylene copolymer (E) and the adhesion promoter (AP). Such additional polymers can be for instance polymeric carriers for additives (AD). Accordingly in one specific embodiment the fiber reinforced polypropylene composition (C) consists of the propylene polymer (PP), the elastomeric ethylene copolymer (E), the adhesion promoter (AP), the short fibers (SF) and additives (AD) including their polymeric carriers.

The fiber reinforced composition (C) comprises the elastomeric ethylene copolymer (E) in rather low amounts in order to achieve a good balance between stiffness and impact properties.

Accordingly, the fiber reinforced composition (C) fulfils in-equation (I), more preferably in-equation (Ia), still more preferably in-equation (Ib), $$\frac{w(PP)}{w(E)} > 2.0, \quad (I)$$

$$30.0 > \frac{w(PP)}{w(E)} > 3.0, \quad (Ia)$$

$$25.0 > \frac{w(PP)}{w(E)} > 3.4, \quad (Ib)$$

wherein w(PP) is the weight fraction [in wt.-%] of the propylene polymer (PP), based on the overall weight of the polypropylene composition (C), and w(E) is the weight fraction [in wt.-%] of the elastomeric ethylene copolymer (E), based on the overall weight of the fiber reinforced composition (C).

Additionally to the previous paragraph, it is preferred that the fiber reinforced composition (C) fulfils in-equation (II), more preferably in-equation (IIa), still more preferably in-equation (IIb), $$\frac{w(SF)}{w(E)} > 3.3, \quad (II)$$

$$30.0 > \frac{w(SF)}{w(E)} > 4.5, \quad (IIa)$$

$$22.0 > \frac{w(SF)}{w(E)} > 6.2, \quad (IIb)$$

wherein w(SF) is the weight fraction [in wt.-%] of the short fibers (SF), based on the overall weight of the polypropylene composition (C), and w(E) is the weight fraction [in wt.-%] of the elastomeric ethylene copolymer (E), based on the overall weight of the fiber reinforced composition (C).

In particular, it is preferred that the fiber reinforced composition comprises 20.0 to 70.0 wt.-%, more preferably 25.0 to 55.0 wt.-%, still more preferably 35.0 to 45.0 wt.-% of the propylene polymer (PP), 2.0 to 12.0 wt.-%, more preferably 2.2 to 11.0 wt.-%, still more preferably 2.5 to 10.0 wt.-% of the elastomeric ethylene copolymer (E), 0.1 to 5.0 wt.-%, more preferably 1.0 to 3.0 wt.-%, still more preferably 1.5 to 2.0 wt.-% of the adhesion promoter (AP) and 10.0 to 70.0 wt.-%, more preferably 20.0 to 65.0 wt.-%, more preferably 25.0 to 60.0 wt.-%, still more preferably 35.0 to 55.0 wt.-% of the short fibers (SF), based on the overall weight of the fiber reinforced composition (C).

As indicated above, the fiber reinforced polypropylene composition (C) may include additives (AD).

Accordingly, it is preferred that the fiber reinforced polypropylene composition (C) comprises, more preferably consists of, 20.0 to 70.0 wt.-%, more preferably 25.0 to 55.0 wt.-%, still more preferably 35.0 to 45.0 wt.-% of the propylene polymer (PP), 2.0 to 12.0 wt.-%, more preferably 2.2 to 11.0 wt.-%, still more preferably 2.5 to 10.0 wt.-% of the elastomeric ethylene copolymer (E), 0.1 to 5.0 wt.-%, more preferably 1.0 to 3.0 wt.-%, still more preferably 1.5 to 2.0 wt.-% of the adhesion promoter (AP), 10.0 to 70.0 wt.-%, more preferably 20.0 to 65.0 wt.-%, more preferably 25.0 to 60.0 wt.-%, still more preferably 35.0 to 55.0 wt.-% of the short fibers (SF), and optionally 0.05 to 5.0 wt.-%, more preferably 0.1 to 4.0 wt.-%, still more preferably 1.0 to 3.0 wt.-% of additives (AD), based on the overall weight of the fiber reinforced composition (C). The additives (AD) are described in more detail below.

According to a preferred embodiment of the present invention, the propylene polymer (PP) is at least bimodal. In particular, it is preferred that the propylene polymer (PP) comprises three propylene polymer fractions, i.e. a first propylene polymer (PP1), a second propylene polymer (PP2) and a third propylene polymer (PP3) having different melt flow rates. Said propylene polymer fractions (PP1), (PP2) and (PP3) are described in more detail below.

It is preferred that the propylene polymer (PP) comprises the first propylene polymer (PP1), the second propylene polymer (PP2) and the third propylene polymer (PP3) in a weight ratio from 1:1:1 to 1:5:1, more preferably 1:1.5:1 to 1:3:1, like 1:2.5:1.

Accordingly, it is preferred that the fiber reinforced polypropylene composition (C) comprises, more preferably consists of, 5.0 to 20.0 wt.-%, more preferably 7.0 to 15.0 wt.-%, still more preferably 7.5.0 to 10.0 wt.-% of the first propylene polymer (PP1), 12.0 to 30.0 wt.-%, more preferably 15.0 to 25.0 wt.-%, still more preferably 19.0 to 23.0 wt.-% of the second propylene polymer (PP2), 4.0 to 15.0 wt.-%, more preferably 5.0 to 12.0 wt.-%, still more preferably 6.0 to 10.0 wt.-% of the third propylene polymer (PP3), 2.0 to 12.0 wt.-%, more preferably 2.2 to 11.0 wt.-%, still more preferably 2.5 to 10.0 wt.-% of the elastomeric ethylene copolymer (E), 0.1 to 5.0 wt.-%, more preferably 1.0 to 3.0 wt.-%, still more preferably 1.5 to 2.0 wt.-% of the adhesion promoter (AP), 10.0 to 70.0 wt.-%, more preferably 20.0 to 65.0 wt.-%, more preferably 25.0 to 60.0 wt.-%, still more preferably 45.0 to 55.0 wt.-% of the short fibers (SF), and optionally 0.5 to 5.0 wt.-%, more preferably 0.1 to 4.0 wt.-%, still more preferably 1.0 to 3.0 wt.-% of additives (AD), based on the overall weight of the fiber reinforced composition (C).

It is preferred that the fiber reinforced polypropylene composition (C) has a melt flow rate $MFR_2$ (230° C., 2.16 kg) determined according to ISO 1133 below 100.0 g/10 min, more preferably in a range of 0.1 to 90.0 g/10 min, still more preferably in a range of 1.0 to 30.0 g/10 min, yet more preferably in a range of 1.5 to 20.0 g/10 min, like in a range of 2.0 to 10.0 g/10 min.

As outlined above, it is appreciated that the fiber reinforced polypropylene composition (C) according to the present invention is a rather stiff material. Accordingly, it is preferred that the fiber reinforced polypropylene composition (C) has a tensile modulus determined according to ISO 527 of at least 4000 MPa, more preferably at least 8000 MPa, more preferably at least 10 000 MPa, still more preferably at least 11 000 MPa.

Further, it is preferred that the inventive fiber reinforced polypropylene composition (C) is featured by an improved impact behavior. Thus, it is preferred that the fiber reinforced polypropylene composition (C) has a puncture energy determined according to ISO 6603 of at least 7.5 J, more preferably at least 8.0 J, more preferably at least 8.5 J, still more preferably at least 9.0 J.

Additionally or alternatively, it is preferred that the fiber reinforced polypropylene composition (C) has a Charpy notched impact strength determined according to ISO 179/1 eA at 23° C. of at least 5.0 kJ/m$^2$, more preferably at least 10. kJ/m$^2$, still more preferably at least 12.0 kg/m$^2$ and/or a Charpy unnotched impact strength determined according to ISO 179/1 eU at 23° C. of at least 40.0 kg/m$^2$, more preferably at least 50.0 kg/m$^2$, still more preferably at least 60.0 kg/m$^2$.

Preferably, the fiber reinforced polypropylene composition (C) according to the present invention is prepared by melt blending the propylene polymer (PP), the elastomeric ethylene copolymer (E), the adhesion promoter (AD), the short fibers (SF) and optionally the additives in a weight ratio as indicated above.

For melt blending the individual components of the instant composition a conventional compounding or blending apparatus, e.g. a Banbury mixer, a 2-roll rubber mill, Buss-co-kneader or a twin screw extruder may be used. The polymer materials recovered from the extruder/mixer are usually in the form of granules. These granules are then preferably further processed, e.g. by injection molding to generate articles and products of the inventive composition.

It is especially preferred that the fiber reinforced composition (C) according to the present invention is prepared by melt blending the individual components in an extruder, preferably a twin screw extruder.

In particular, it is preferred that the fiber reinforced composition (C) according to the present invention is obtained by a process comprising the steps of (a) feeding the propylene polymer (PP), the elastomeric ethylene copolymer (E), the adhesion promoter (AP) and optionally the additives (AD) into an extruder, preferably a twin screw extruder,
(b) melt-kneading the composition obtained in step (a) at a temperature of 200 to 270° C.,
(c) feeding the short fibers (SF) into the extruder, preferably twin screw extruder, containing the composition obtained in step (b),
(d) melt-kneading the composition obtained in step (c) at a temperature of 200 to 270° C., thereby obtaining the fiber reinforced composition (C).

In the following, the propylene polymer (PP), the elastomeric ethylene copolymer (E), the adhesion promoter (AP) and the short fibers (SF) are described in more detail.

The Propylene Polymer (PP)

As outlined above, the fiber reinforced polypropylene composition (C) comprises a propylene polymer (PP).

The propylene polymer (PP) can be a propylene copolymer or a propylene homopolymer, the latter being preferred.

In case the propylene polymer (PP) is a propylene copolymer, the propylene polymer (PP) comprises monomers copolymerizable with propylene, for example comonomers such as ethylene and/or $C_4$ to $C_8$ α-olefins, in particular ethylene and/or $C_4$ to $C_6$ α-olefins, e.g. 1-butene and/or 1-hexene. Preferably the propylene polymer (PP) according to this invention comprises, especially consists of, monomers copolymerizable with propylene from the group consisting of ethylene, 1-butene and 1-hexene. More specifically the propylene polymer (PP) of this invention comprises—apart from propylene—units derivable from ethylene and/or 1-butene. In a preferred embodiment the propylene polymer (PP) comprises units derivable from ethylene and propylene only.

The comonomer content of the propylene polymer (PP) is in the range of 0.0 to 5.0 mol-%, yet more preferably in the range of 0.0 to 3.0 mol-%, still more preferably in the range of 0.0 to 1.0 mol-%.

It is especially preferred that the propylene polymer (PP) is a propylene homopolymer (H-PP).

According to the present invention the expression "propylene homopolymer" relates to a polypropylene that consists substantially, i.e. of at least 99.0 wt.-%, more preferably of at least 99.5 wt.-%, still more preferably of at least 99.8 wt.-%, like of at least 99.9 wt.-%, of propylene units. In another embodiment only propylene units are detectable, i.e. only propylene has been polymerized.

Preferably the propylene polymer (PP), like the propylene homopolymer (H-PP), is isotactic. Accordingly, it is preferred that the propylene polymer (PP), like the propylene homopolymer (H-PP), has a rather high pentad concentration (mmmm %) i.e. more than 94.1%, more preferably more than 94.4%, like more than 94.4 to 98.5%, still more preferably at least 94.7%, like in the range of 94.7 to 97.5%.

It is preferred that the propylene polymer (PP), like the propylene homopolymer (H-PP), is featured by rather low cold xylene soluble (XCS) content, i.e. by a xylene cold soluble (XCS) below 3.1 wt.-% Accordingly, the propylene polymer (PP), like the propylene homopolymer (H-PP), has preferably a xylene cold soluble content (XCS) in the range of 1.0 to 3.0 wt.-%, more preferably in the range of 1.5 to 2.8 wt.-%, still more preferably in the range of 2.0 to 2.6 wt.-%.

The amount of xylene cold solubles (XCS) additionally indicates that the propylene polymer (PP), like the propylene homopolymer (H-PP), is preferably free of any elastomeric polymer component, like an ethylene propylene rubber. In other words, the propylene polymer (PP), like the propylene homopolymer (H-PP), shall be not a heterophasic polypropylene, i.e. a system consisting of a polypropylene matrix in which an elastomeric phase is dispersed. Such systems are featured by a rather high xylene cold soluble content.

The amount of xylene cold solubles (XCS) additionally indicates that the propylene polymer (PP), like the propylene homopolymer (H-PP), preferably does not contain elastomeric (co)polymers forming inclusions as a second phase for improving mechanical properties. A polymer containing elastomeric (co)polymers as insertions of a second phase would by contrast be called heterophasic and is preferably not part of the present invention. The presence of second phases or the so called inclusions are for instance visible by high resolution microscopy, like electron microscopy or atomic force microscopy, or by dynamic mechanical thermal analysis (DMTA). Specifically in DMTA the presence of a multiphase structure can be identified by the presence of at least two distinct glass transition temperatures.

Accordingly, it is preferred that the propylene polymer (PP), like the propylene homopolymer (H-PP), according to this invention has no glass transition temperature below −30° C., preferably below −25° C., more preferably below −20° C.

On the other hand, in one preferred embodiment the propylene polymer (PP), like the propylene homopolymer (H-PP), according to this invention has a glass transition temperature in the range of −12 to 4° C., more preferably in the range of −10 to 4° C.

Further, the propylene polymer (PP), like the propylene homopolymer (H-PP), is preferably a crystalline propylene homopolymer. The term "crystalline" indicates that the propylene polymer (PP), like the propylene homopolymer (H-PP), has a rather high melting temperature. Accordingly throughout the invention the propylene polymer (PP), like the propylene homopolymer (H-PP), is regarded as crystalline unless otherwise indicated. Therefore, the propylene polymer (PP), like the propylene homopolymer (H-PP), preferably has a melting temperature Tm measured by differential scanning calorimetry (DSC) of at least 160° C., more preferably at least 161° C., still more preferably at least 163° C., like in the range of 163° C. to 167° C.

Further it is preferred that the propylene polymer (PP), like the propylene homopolymer (H-PP), has a crystallization temperature Tc measured by differential scanning calorimetry (DSC) of equal or more than 108° C., more preferably in the range of 110 to 130° C., more preferably in the range of 112 to 126° C.

It is appreciated that the propylene polymer (PP) is featured by a moderate melt flow rate. Accordingly, the propylene polymer (PP) has a melt flow rate $MFR_2$ (230° C., 2.16 kg) determined according to ISO 1133 in the range of 10 to 250 g/10 min, preferably in the range of 50 to 150 g/10 min, more preferably in the range of 60 to 120 g/10 min, like in the range of 60 to 80 g/10 min.

According to a preferred embodiment of the present invention, the propylene polymer (PP) is at least bimodal.

Accordingly, it is preferred that the propylene polymer (PP) comprises at least two, like three propylene polymer fractions. It is especially preferred that the propylene polymer (PP) comprises three propylene polymer fractions, i.e. a first propylene polymer (PP1), a second propylene polymer (PP2) and a third propylene polymer (PP3).

Preferably, the first propylene polymer (PP1), the second propylene polymer (PP2) and the third propylene polymer (PP3) have different melt flow rates $MFR_2$ (230° C., 2.16 kg) determined according to ISO 1133.

Preferably, the propylene polymer (PP) comprises the first propylene polymer (PP1), the second propylene polymer (PP2) and the third propylene polymer (PP3) in a weight ratio from 1:1:1 to 1:5:1, more preferably 1:1.5:1 to 1:3:1, like 1:2.5:1.

Additionally or alternatively to the previous paragraph, it is preferred that the propylene polymer (PP) comprises
i) 10.0 to 35.0 wt.-%, more preferably 15.0 to 30.0 wt.-%, still more preferably 20.0 to 25.0 wt.-% of the first propylene polymer (PP1),
ii) 30.0 to 70.0 wt.-%, more preferably 40.0 to 60.0 wt.-%, still more preferably 45.0 to 56.0 wt.-% of the second propylene polymer (PP2), and
iii) 10.0 to 35.0 wt.-%, more preferably 15.0 to 30.0 wt.-%, still more preferably 20.0 to 25.0 wt.-% of the third propylene polymer (PP3),
based on the overall weight of the propylene polymer (PP).

The first propylene polymer (PP1), the second propylene polymer (PP2) and the third propylene polymer (PP3) can be propylene copolymers or propylene homopolymers, respectively.

In case the first propylene polymer (PP1), the second propylene polymer (PP2) and/or the third propylene polymer (PP3) are propylene copolymers, said propylene polymers comprise monomers copolymerizable with propylene, for example comonomers such as ethylene and/or $C_4$ to $C_8$ α-olefins, in particular ethylene and/or $C_4$ to $C_6$ α-olefins, e.g. 1-butene and/or 1-hexene. Preferably the first propylene polymer (PP1), the second propylene polymer (PP2) and/or the third propylene polymer (PP3) according to this invention comprise, especially consist of, monomers copolymerizable with propylene from the group consisting of ethylene, 1-butene and 1-hexene. More specifically the first propylene polymer (PP1), the second propylene polymer (PP2) and/or the third propylene polymer (PP3) of this invention comprise—apart from propylene—units derivable from ethylene and/or 1-butene. In a preferred embodiment the propylene polymer (PP) comprises units derivable from ethylene and propylene only.

The comonomer contents of the first propylene polymer (PP1), the second propylene polymer (PP2) and/or the third propylene polymer (PP3) are in the range of 0.0 to 5.0 mol-%, yet more preferably in the range of 0.0 to 3.0 mol-%, still more preferably in the range of 0.0 to 1.0 mol-%, respectively.

As outlined above, however, it is preferred that the propylene polymer (PP) is a propylene homopolymer (H-PP). Thus, it is preferred that all propylene polymer fractions of the propylene polymer (PP), i.e. the first propylene polymer (PP1), the second propylene polymer (PP2) and the third propylene polymer (PP3), are propylene homopolymers. Regarding the expression "propylene homopolymer", reference is made to the definition provided above.

In the following, the first propylene polymer (PP1), the second propylene polymer (PP2) and the third propylene polymer (PP3) are described in more detail.

The First Propylene Polymer (PP1)

The first propylene polymer (PP1) is preferably a high flow propylene polymer. Thus, it is preferred that the first propylene polymer (PP1) has a melt flow rate $MFR_2$ (230° C., 2.16 kg) determined according to ISO 1133 of at least 100 g/10 min, more preferably in the range of 100 to 800 g/10 min, still more preferably in the range of 200 to 500 g/10 min, yet more preferably in the range of 300 to 490 g/10 min, like in the range of 400 to 480 g/10 min.

In this regard, it is preferred that the first propylene polymer (PP1) is visbroken. Unless otherwise indicated, throughout the instant invention the melt flow rate $MFR_2$ (230° C./2.16 kg) of the first propylene polymer (PP1), is preferably the melt flow rate (230° C./2.16 kg) after visbreaking.

Accordingly, the melt flow rate $MFR_2$ (initial) (230° C./2.16 kg), i.e. the melt flow rate before visbreaking, of the first propylene polymer (PP1) is much lower, like from 15 to 150 g/10 min. For example, the melt flow rate $MFR_2$ (initial) (230° C./2.16 kg) of the first propylene polymer (PP1) before visbreaking is from 30 to 140 g/10 min, like from 50 to 120 g/10 min.

In one embodiment of the present invention, the first propylene polymer (PP1) has been visbroken with a visbreaking ratio [final $MFR_2$ (230° C./2.16 kg)/initial $MFR_2$ (230° C./2.16 kg)] at least 5, wherein "final $MFR_2$ (230° C./2.16 kg)" is the $MFR_2$ (230° C./2.16 kg) of the first propylene polymer (PP1) after visbreaking and "initial $MFR_2$ (230° C./2.16 kg)" is the $MFR_2$ (230° C./2.16 kg) of the first propylene polymer (PP1) before visbreaking. Preferably, the first propylene polymer (PP1) has been visbroken with a visbreaking ratio [final $MFR_2$ (230° C./2.16 kg)/initial $MFR_2$ (230° C./2.16 kg)] of 5 to 25, wherein "final $MFR_2$ (230° C./2.16 kg)" is the $MFR_2$ (230° C./2.16 kg) of the propylene homopolymer after visbreaking and "initial $MFR_2$ (230° C./2.16 kg)" is the $MFR_2$ (230° C./2.16 kg) of the propylene homopolymer before visbreaking. More preferably, the first propylene polymer (PP1) has been visbroken with a visbreaking ratio [final $MFR_2$ (230° C./2.16 kg)/initial $MFR_2$ (230° C./2.16 kg)] of 5 to 15, wherein "final $MFR_2$ (230° C./2.16 kg)" is the $MFR_2$ (230° C./2.16 kg) of the first propylene polymer (PP1) after visbreaking and "initial $MFR_2$ (230° C./2.16 kg)" is the $MFR_2$ (230° C./2.16 kg) of the first propylene polymer (PP1) before visbreaking.

As mentioned above, one characteristic of first propylene polymer (PP1) is that the first propylene polymer (PP1) has been visbroken. Preferred mixing devices suited for visbreaking are discontinuous and continuous kneaders, twin screw extruders and single screw extruders with special mixing sections and co-kneaders.

By visbreaking the first propylene polymer (PP1) with heat or at more controlled conditions with peroxides, the molar mass distribution (MWD) becomes narrower because the long molecular chains are more easily broken up or scissored and the molar mass M, will decrease, corresponding to an $MFR_2$ increase. The $MFR_2$ increases with increase in the amount of peroxide which is used.

Such visbreaking may be carried out in any known manner, like by using a peroxide visbreaking agent. Typical visbreaking agents are 2,5-dimethyl-2,5-bis(tert.butyl-peroxy)hexane (DHBP) (for instance sold under the tradenames Luperox 101 and Trigonox 101), 2,5-dimethyl-2,5-bis(tert.butyl-peroxy)hexyne-3 (DYBP) (for instance sold under the tradenames Luperox 130 and Trigonox 145), dicumyl-peroxide (DCUP) (for instance sold under the tradenames Luperox DC and Perkadox BC), di-tert.butyl-peroxide (DTBP) (for instance sold under the tradenames Trigonox B and Luperox Di), tert.butyl-cumyl-peroxide (BCUP) (for instance sold under the tradenames Trigonox T and Luperox 801) and bis (tert.butylperoxy-isopropyl)benzene (DIPP) (for instance sold under the tradenames Perkadox 14S and Luperox DC). Suitable amounts of peroxide to be employed in accordance with the present invention are in principle known to the skilled person and can easily be calculated on the basis of the amount of first propylene polymer (PP1) to be subjected to visbreaking, the $MFR_2$ (230° C./2.16 kg) value of the first propylene polymer (PP1) to be subjected to visbreaking and the desired target $MFR_2$ (230° C./2.16 kg) of the product to be obtained. Accordingly, typical amounts of peroxide visbreaking agent are from 0.005 to 0.7 wt.-%, more preferably from 0.01 to 0.4 wt.-%, based on the total amount of first propylene polymer (PP1) employed.

Typically, visbreaking in accordance with the present invention is carried out in an extruder, so that under the suitable conditions, an increase of melt flow rate is obtained. During visbreaking, higher molar mass chains of the starting product are broken statistically more frequently than lower molar mass molecules, resulting as indicated above in an overall decrease of the average molecular weight and an increase in melt flow rate.

The first propylene polymer (PP1) is preferably obtained by visbreaking the first propylene polymer (PP1) preferably visbreaking by the use of peroxide.

A further characteristic of the first propylene polymer (PP1) is the low amount of misinsertions of propylene within the polymer chain, which indicates that the first propylene polymer (PP1) is produced in the presence of a Ziegler-Natta catalyst, preferably in the presence of a Ziegler-Natta catalyst (ZN-C1) as defined in more detail below. Accordingly, the first propylene polymer (PP1) is preferably featured by low amount of 2,1 erythro regio-defects, i.e. of equal or below 0.4 mol.-%, more preferably of equal or below than 0.2 mol.-%, like of not more than 0.1 mol.-%, determined by $^{13}$C-NMR spectroscopy. In an especially preferred embodiment no 2,1 erythro regio-defects are detectable.

It is preferred that the first propylene polymer (PP1) is featured by rather low cold xylene soluble (XCS) content, i.e. by a xylene cold soluble (XCS) below 4.1 wt.-% Accordingly, the first propylene polymer (PP1) has preferably a xylene cold soluble content (XCS) in the range of 1.0 to 4.0 wt.-%, more preferably in the range of 2.0 to 3.8 wt.-%, still more preferably in the range of 2.2 to 3.5 wt.-%.

The amount of xylene cold solubles (XCS) additionally indicates that the first propylene polymer (PP1) is preferably free of any elastomeric polymer component, like an ethylene propylene rubber. In other words, the first propylene polymer (PP1) shall be not a heterophasic polypropylene, i.e. a system consisting of a polypropylene matrix in which an elastomeric phase is dispersed. Such systems are featured by a rather high xylene cold soluble content.

The amount of xylene cold solubles (XCS) additionally indicates that the first propylene polymer (PP1) preferably does not contain elastomeric (co)polymers forming inclusions as a second phase for improving mechanical properties. A polymer containing elastomeric (co)polymers as insertions of a second phase would by contrast be called heterophasic and is preferably not part of the present invention. The presence of second phases or the so called inclusions are for instance visible by high resolution microscopy, like electron microscopy or atomic force microscopy, or by dynamic mechanical thermal analysis (DMTA). Specifically in DMTA the presence of a multiphase structure can be identified by the presence of at least two distinct glass transition temperatures.

Accordingly, it is preferred that the first propylene polymer (PP1) according to this invention has no glass transition temperature below −30° C., preferably below −25° C., more preferably below −20° C.

On the other hand, in one preferred embodiment the first propylene polymer (PP1) according to this invention has a glass transition temperature in the range of −12 to 6° C., more preferably in the range of −10 to 4° C.

Further, the first propylene polymer (PP1) is preferably a crystalline propylene homopolymer. The term "crystalline" indicates that the first propylene polymer (PP1) has a rather high melting temperature. Accordingly throughout the invention the first propylene polymer (PP1) is regarded as crystalline unless otherwise indicated. Therefore, the first propylene polymer (PP1) preferably has a melting temperature Tm measured by differential scanning calorimetry (DSC) of at least 158° C., more preferably at least 160° C., still more preferably at least 161° C., like in the range of 161° C. to 165° C.

Further it is preferred that the first propylene polymer (PP1) has a crystallization temperature Tc measured by differential scanning calorimetry (DSC) of equal or more than 110° C., more preferably in the range of 110 to 128° C., more preferably in the range of 114 to 120° C.

Preferably, the first propylene polymer (PP1) is obtained by polymerizing propylene in the presence of a Ziegler-Natta catalyst as defined below. More preferably, the first propylene polymer (PP1) according to this invention is obtained by a process as defined in detail below by using the Ziegler-Natta catalyst.

The first propylene polymer (PP1) according to this invention is preferably produced in the presence of
(a) a Ziegler-Natta catalyst (ZN-C1) comprising compounds (TC) of a transition metal of Group 4 to 6 of IUPAC, a Group 2 metal compound (MC) and an internal donor (ID);
(b) optionally a co-catalyst (Co), and
(c) optionally an external donor (ED).

Preferably, the first propylene polymer (PP1) is produced in a polymerization process as further described below comprising at least one reactor, like two reactors (R1 and R2).

Preferably, the first propylene polymer (PP1) is produced in one polymerization reactor (R1).

The process for the preparation of the propylene homopolymer as well as the Ziegler-Natta catalyst are further described in detail below.

The polymerization reactor (R1) can be a gas phase reactor (GPR) or a slurry reactor (SR). A gas phase reactor (GPR) according to this invention is preferably a fluidized bed reactor, a fast fluidized bed reactor or a settled bed reactor or any combination thereof.

Preferably, the polymerization reactor (R1) is a slurry reactor (SR) which can be any continuous or simple stirred batch tank reactor or loop reactor operating in bulk or slurry. Bulk means a polymerization in a reaction medium that comprises of at least 60% (w/w) monomer. According to the present invention the slurry reactor (SR) is preferably a (bulk) loop reactor (LR).

The second polymerization reactor (R2) and any subsequent reactor, if present, are preferably gas phase reactors (GPRs). Such gas phase reactors (GPR) can be any mechanically mixed or fluid bed reactors. Preferably the gas phase reactors (GPRs) comprise a mechanically agitated fluid bed reactor with gas velocities of at least 0.2 m/sec. Thus it is appreciated that the gas phase reactor is a fluidized bed type reactor preferably with a mechanical stirrer.

If any subsequent reactor is present, the propylene homopolymer of the first polymerization reactor (R1), is preferably directly fed into the second polymerization reactor (R2), i.e. into the (first) gas phase reactor (GPR1), without a flash step between the stages. This kind of direct feed is described in EP 887379 A, EP 887380 A, EP 887381 A and EP 991684 A. By "direct feed" is meant a process wherein the content of the first polymerization reactor (R1), i.e. of the loop reactor (LR), is led directly to the next stage gas phase reactor.

Alternatively, the propylene homopolymer of the first polymerization reactor (R1), more preferably polymer slurry of the loop reactor (LR), may be also directed into a flash step or through a further concentration step before fed into the second polymerization reactor (R2), i.e. into the gas phase reactor (GPR). Accordingly, this "indirect feed" refers to a process wherein the content of the first polymerization reactor (R1), of the loop reactor (LR), i.e. the polymer slurry, is fed into the second polymerization reactor (R2), into the (first) gas phase reactor (GPR1), via a reaction medium separation unit and the reaction medium as a gas from the separation unit.

However, it is preferred that the propylene polymer (PP1) is prepared in one reactor, i.e. the polymerization reactor (R1) being a loop reactor (LR).

If needed prior to the slurry reactor (SR), i.e. the loop reactor (LR), a pre-polymerization reactor is placed.

The Ziegler-Natta catalyst is fed into the polymerization reactor (R1). If the process covers also a pre-polymerization step it is preferred that all of the Ziegler-Natta catalyst is fed in the pre-polymerization reactor. Subsequently the pre-polymerization product containing the Ziegler-Natta catalyst is transferred into the polymerization reactor (R1).

A preferred multistage process is a "loop-gas phase"-process, such as developed by *Borealis* A/S, Denmark (known as BORSTAR® technology) described e.g. in patent literature, such as in EP 0 887 379, WO 92/12182 WO 2004/000899, WO 2004/111095, WO 99/24478, WO 99/24479 or in WO 00/68315.

Especially good results are achieved in case the temperature in the reactors is carefully chosen.

Accordingly it is preferred that the operating temperature in the polymerization reactor (R1) is in the range of 62 to 90° C., more preferably in the range of 65 to 85° C., still more preferably in the range of 67 to 83° C.

Typically the pressure in the polymerization reactor (R1), preferably in the loop reactor (LR), is in the range from 20 to 80 bar, preferably 30 to 70 bar, like 35 to 65 bar. Preferably hydrogen is added in each polymerization reactor in order to control the molecular weight, i.e. the melt flow rate $MFR_2$.

Preferably the average residence time is rather long in the polymerization reactors (R1). In general, the average residence time ($\tau$) is defined as the ratio of the reaction volume ($V_R$) to the volumetric outflow rate from the reactor ($Q_o$) (i.e. $V_R/Q_o$), i.e $\tau = V_R/Q_o$ [tau=$V_R/Q_o$]. In case of a loop reactor the reaction volume ($V_R$) equals to the reactor volume.

Accordingly the average residence time ($\tau$) in the polymerization reactor (R1) is preferably at least 15 min, more preferably in the range of 15 to 90 min, still more preferably in the range of 20 to 80 min, like in the range of 24 to 60 min.

As mentioned above the preparation of the propylene homopolymer can comprise in addition to the (main) polymerization of the propylene homopolymer in the polymerization reactor (R1) prior thereto a pre-polymerization in a pre-polymerization reactor (PR) upstream to the polymerization reactor (R1).

In the pre-polymerization reactor (PR) a polypropylene (Pre-PP) is produced. The pre-polymerization is conducted in the presence of the Ziegler-Natta catalyst. According to this embodiment the Ziegler-Natta catalyst, the co-catalyst (Co), and the external donor (ED) are all introduced to the pre-polymerization step. However, this shall not exclude the option that at a later stage for instance further co-catalyst (Co) and/or external donor (ED) is added in the polymerization process, for instance in the first reactor (R1). In one embodiment the Ziegler-Natta catalyst, the co-catalyst (Co), and the external donor (ED) are only added in the pre-polymerization reactor (PR), if a pre-polymerization is applied.

The pre-polymerization reaction is typically conducted at a temperature of 0 to 60° C., preferably from 15 to 50° C., and more preferably from 20 to 45° C.

The pressure in the pre-polymerization reactor is not critical but must be sufficiently high to maintain the reaction mixture in liquid phase. Thus, the pressure may be from 20 to 100 bar, for example 30 to 70 bar.

In a preferred embodiment, the pre-polymerization is conducted as bulk slurry polymerization in liquid propylene, i.e. the liquid phase mainly comprises propylene, with optionally inert components dissolved therein. Furthermore, according to the present invention, an ethylene feed is employed during pre-polymerization as mentioned above.

It is possible to add other components also to the pre-polymerization stage. Thus, hydrogen may be added into the pre-polymerization stage to control the molecular weight of the polypropylene (Pre-PP) as is known in the art. Further, antistatic additive may be used to prevent the particles from adhering to each other or to the walls of the reactor.

The precise control of the pre-polymerization conditions and reaction parameters is within the skill of the art.

Due to the above defined process conditions in the pre-polymerization, preferably a mixture (MI) of the Ziegler-Natta catalyst and the polypropylene (Pre-PP) produced in the pre-polymerization reactor (PR) is obtained. Preferably the Ziegler-Natta catalyst is (finely) dispersed in the polypropylene (Pre-PP). In other words, the Ziegler-Natta catalyst particles introduced in the pre-polymerization reactor (PR) split into smaller fragments which are evenly distributed within the growing polypropylene (Pre-PP). The sizes of the introduced Ziegler-Natta catalyst particles as well as of the obtained fragments are not of essential relevance for the instant invention and within the skilled knowledge.

As mentioned above, if a pre-polymerization is used, subsequent to said pre-polymerization, the mixture (MI) of the Ziegler-Natta catalyst and the polypropylene (Pre-PP) produced in the pre-polymerization reactor (PR) is transferred to the first reactor (R1). Typically the total amount of the polypropylene (Pre-PP) in the final propylene polymer (PP1) is rather low and typically not more than 5.0 wt.-%, more preferably not more than 4.0 wt.-%, still more preferably in the range of 0.5 to 4.0 wt.-%, like in the range 1.0 of to 3.0 wt.-%. In case that pre-polymerization is not used, propylene and the other ingredients such as the Ziegler-Natta catalyst are directly introduced into the first polymerization reactor (R1).

Accordingly, the propylene homopolymer is preferably produced in a process comprising the following steps under the conditions set out above (a) in the first polymerization reactor (R1), i.e. in a loop reactor (LR), propylene is polymerized obtaining the first propylene polymer (PP1).

A pre-polymerization as described above can be accomplished prior to step (a).

In the process described above a Ziegler-Natta catalyst (ZN-C1) for the preparation of the first propylene polymer (PP1) is applied. This Ziegler-Natta catalyst (ZN-C1) can be any stereospecific Ziegler-Natta catalyst (ZN-C1) for propylene polymerization, which preferably is capable of catalyzing the polymerization and copolymerization of propylene and optional comonomers at a pressure of 500 to 10000 kPa, in particular 2500 to 8000 kPa, and at a temperature of 40 to 110° C., in particular of 60 to 110° C.

Preferably, the Ziegler-Natta catalyst (ZN-C1) comprises a high-yield Ziegler-Natta type catalyst including an internal donor component, which can be used at high polymerization temperatures of 80° C. or more. Such high-yield Ziegler-Natta catalyst (ZN-C1) can comprise a succinate, a diether, a phthalate etc., or mixtures therefrom as internal donor (ID) and are for example commercially available from Lyondell-Basell under the Avant ZN trade name. Examples of the Avant ZN series are Avant ZN 126 and Avant ZN 168. Avant ZN 126 is a Ziegler-Natta catalyst with 3.5 wt % titanium and a diether compound as internal electron donor, which is commercially available from LyondellBasell. Avant ZN 168 is a Ziegler-Natta catalyst with 2.6 wt % titanium and a succinate compound as internal electron donor, which is commercially available from LyondellBaselll. A further example of the Avant ZN series is the catalyst ZN180M of LyondellBasell.

Additional suitable catalysts are described for example in WO 2012/007430, EP2610271, EP261027 and EP2610272.

The Ziegler-Natta catalyst (ZN-C1) is preferably used in association with an alkyl aluminum cocatalyst and optionally external donors.

As further component in the instant polymerization process an external donor (ED) is preferably present. Suitable external donors (ED) include certain silanes, ethers, esters, amines, ketones, heterocyclic compounds and blends of these. It is especially preferred to use a silane. It is most preferred to use silanes of the general formula

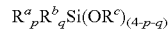

$$R^a_p R^b_q Si(OR^c)_{(4-p-q)}$$

wherein $R^a$, $R^b$ and $R^c$ denote a hydrocarbon radical, in particular an alkyl or cycloalkyl group, and wherein p and q are numbers ranging from 0 to 3 with their sum p+q being equal to or less than 3. $R^a$, $R^b$ and $R^c$ can be chosen independently from one another and can be the same or different. Specific examples of such silanes are (tert-butyl)$_2$Si(OCH$_3$)$_2$, (cyclohexylxmethyl)Si(OCH$_3$)$_2$, (phenyl)$_2$Si(OCH$_3$)$_2$ and (cyclopentyl)$_2$Si(OCH$_3$)$_2$, or of general formula

$$Si(OCH_2CH_3)_3(NR^3R^4)$$

wherein R3 and R4 can be the same or different a represent a hydrocarbon group having 1 to 12 carbon atoms.

R3 and R4 are independently selected from the group consisting of linear aliphatic hydrocarbon group having 1 to 12 carbon atoms, branched aliphatic hydrocarbon group having 1 to 12 carbon atoms and cyclic aliphatic hydrocarbon group having 1 to 12 carbon atoms. It is in particular preferred that R3 and R4 are independently selected from the group consisting of methyl, ethyl, n-propyl, n-butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl.

More preferably both $R^3$ and $R^4$ are the same, yet more preferably both $R^3$ and $R^4$ are an ethyl group.

Especially preferred external donors (ED) are the dicyclopentyl dimethoxy silane donor (D donor) or the cyclohexylmethyl dimethoxy silane donor (C-Donor).

In addition to the Ziegler-Natta catalyst (ZN-C1) and the optional external donor (ED) a cocatalyst can be used. The co-catalyst is preferably a compound of group 13 of the periodic table (IUPAC), e.g. organo aluminum, such as an aluminum compound, like aluminum alkyl, aluminum halide or aluminum alkyl halide compound. Accordingly, in one specific embodiment the co-catalyst (Co) is a trialkyl-aluminum, like triethylaluminum (TEAL), dialkyl aluminum chloride or alkyl aluminum dichloride or mixtures thereof. In one specific embodiment the co-catalyst (Co) is triethylaluminum (TEAL).

Preferably the ratio between the co-catalyst (Co) and the external donor (ED) [Co/ED] and/or m the ratio between the co-catalyst (Co) and the transition metal (TM) [Co/TM] should be carefully chosen.

Accordingly,
(a) the mol-ratio of co-catalyst (Co) to external donor (ED) [Co/ED] must be in the range of 5 to 45, preferably is in the range of 5 to 35, more preferably is in the range of 5 to 25;
and optionally
(b) the mol-ratio of co-catalyst (Co) to titanium compound (TC) [Co/TC] must be in the range of above 80 to 500, preferably is in the range of 90 to 350, still more preferably is in the range of 100 to 300.

The second propylene polymer (PP2)

The second propylene polymer (PP2) preferably has a moderate melt flow rate. Accordingly, it is preferred that the melt flow rate $MFR_2$ (230° C., 2.16 kg) determined according to ISO 1133 of the second propylene polymer (PP2) is in the range of 20.0 to 150.0 g/10 min, more preferably in the range of 40.0 to 120.0 g/10 min, still more preferably in the range of 60.0 to 90.0 g/10 min.

It is preferred that the second propylene polymer (PP2) is featured by rather low cold xylene soluble (XCS) content, i.e. by a xylene cold soluble (XCS) below 4.1 wt.-% Accordingly, the second propylene polymer (PP2) has preferably a xylene cold soluble content (XCS) in the range of 1.0 to 4.0 wt.-%, more preferably in the range of 2.0 to 3.8 wt.-%, still more preferably in the range of 2.2 to 3.5 wt.-%.

Thus, similar to the first propylene polymer (PP1), it is preferred that the second propylene polymer (PP2) is free of any elastomeric component. In this regard, reference is made to the definitions provided above.

Accordingly, it is preferred that the second propylene polymer (PP2) according to this invention has no glass transition temperature below −30° C., preferably below −25° C., more preferably below −20° C.

On the other hand, in one preferred embodiment the second propylene polymer (PP2) according to this invention has a glass transition temperature in the range of −12 to 6° C., more preferably in the range of −10 to 4° C.

Further, the second propylene polymer (PP2) is preferably a crystalline propylene homopolymer. Regarding the term "crystalline", reference is made to the definition provided above. Therefore, second propylene polymer (PP2) preferably has a melting temperature Tm measured by differential scanning calorimetry (DSC) of at least 158° C., more preferably at least 160° C., still more preferably at least 161° C., like in the range of 161° C. to 165° C.

Further it is preferred that the second propylene polymer (PP2) has a crystallization temperature Tc measured by differential scanning calorimetry (DSC) of equal or more than 108° C., more preferably in the range of 110 to 128° C., more preferably in the range of 112 to 120° C.

Preferably, the second propylene polymer (PP2) is obtained by polymerizing propylene in the presence of a Ziegler-Natta catalyst. More preferably, the second propylene polymer (PP2) according to this invention is obtained by a process using the Ziegler-Natta catalyst.

For the preparation of the second propylene polymer (PP2), the polymerization process and Ziegler-Natta catalyst described above for the first propylene polymer (PP1) can be used. Therefore, reference is made to the process and Ziegler-Natta catalyst described above for the first propylene polymer (PP1).

The third propylene polymer (PP3)

The third propylene polymer (PP3) preferably has a melt flow rate $MFR_2$ (230° C., 2.16 kg) determined according to ISO 1133 in the range of 0.1 to 50.0 g/10 min, more preferably in the range of 1.0 to 30.0 g/10 min, still more preferably in the range of 10.0 to 28.0 g/10 min.

It is also preferred that the third propylene polymer (PP3) has a rather low cold xylene soluble (XCS) content, i.e. by a xylene cold soluble (XCS) below 4.1 wt.-% Accordingly, the third propylene polymer (PP3) has preferably a xylene cold soluble content (XCS) in the range of 1.0 to 4.0 wt.-%, more preferably in the range of 1.5 to 3.8 wt.-%, still more preferably in the range of 2.0 to 3.5 wt.-%.

Thus, similar to the first propylene polymer (PP1) and the second propylene polymer (PP2), it is preferred that the third propylene polymer (PP3) is free of any elastomeric component. In this regard, reference is made to the definitions provided above.

Accordingly, it is preferred that the third propylene polymer (PP3) according to this invention has no glass transition temperature below −30° C., preferably below −25° C., more preferably below −20° C.

On the other hand, in one preferred embodiment the third propylene polymer (PP3) according to this invention has a glass transition temperature in the range of −12 to 6° C., more preferably in the range of −10 to 4° C.

Further, the third propylene polymer (PP3) is preferably a crystalline propylene homopolymer. Regarding the term "crystalline", reference is made to the definition provided above. Therefore, third propylene polymer (PP3) preferably has a melting temperature Tm measured by differential scanning calorimetry (DSC) of at least 160° C., more preferably at least 161° C., still more preferably at least 163° C., like in the range of 163° C. to 167° C.

Further it is preferred that the third propylene polymer (PP3) has a crystallization temperature Tc measured by differential scanning calorimetry (DSC) of equal or more than 110° C., more preferably in the range of 110 to 130° C., more preferably in the range of 114 to 128° C.

Preferably, the third propylene polymer (PP3) is nucleated, more preferably α-nucleated. Accordingly, it is preferred that the third propylene polymer (PP3) is prepared in the presence of a nucleating agent, preferably an α-nucleating agent.

In case the third propylene polymer (PP3) comprises an α-nucleating agent, it is preferred that it is free of β-nucleating agents. The α-nucleating agent is preferably selected from the group consisting of
(i) salts of monocarboxylic acids and polycarboxylic acids, e.g. sodium benzoate or aluminum tert-butylbenzoate, and
(ii) dibenzylidenesorbitol (e.g. 1,3:2,4 dibenzylidenesorbitol) and $C_1$-$C_8$-alkyl-substituted dibenzylidenesorbitol derivatives, such as methyldibenzylidenesorbitol, ethyldibenzylidenesorbitol or dimethyldibenzylidenesorbitol (e.g. 1,3:2,4 di(methylbenzylidene) sorbitol), or substituted nonitol-derivatives, such as 1,2,3,-trideoxy-4,6:5,7-bis-O-[(4-propylphenyl)methylene]-nonitol, and
(iii) salts of diesters of phosphoric acid, e.g. sodium 2,2'-methylenebis (4,6,-di-tert-butylphenyl) phosphate or aluminum-hydroxy-bis[2,2'-methylene-bis(4,6-di-t-butylphenyl)phosphate], and
(iv) vinylcycloalkane polymer and vinylalkane polymer (as discussed in more detail below), and
(v) mixtures thereof.

Such additives are generally commercially available and are described, for example, in "Plastic Additives Handbook", pages 871 to 873, 5th edition, 2001 of Hans Zweifel.

Preferably the third propylene polymer (PP3) contains up to 5.0 wt.-% of the α-nucleating agent. In a preferred embodiment, the propylene homopolymer contains not more than 500 ppm, more preferably of 0.025 to 200 ppm, more preferably of 0.1 to 200 ppm, still more preferably 0.3 to 200 ppm, most preferably 0.3 to 100 ppm of a α-nucleating agent, in particular selected from the group consisting of dibenzylidenesorbitol (e.g. 1,3:2,4 dibenzylidene sorbitol), dibenzylidenesorbitol derivative, preferably dimethyldibenzylidenesorbitol (e.g. 1,3:2,4 di(methylbenzylidene) sorbitol), or substituted nonitol-derivatives, such as 1,2,3,-trideoxy-4,6:5,7-bis-O-[(4-propylphenyl)methylene]-nonitol, sodium 2,2'-methylenebis (4,6,-di-tert-butylphenyl) phosphate, vinylcycloalkane polymer, vinylalkane polymer, and mixtures thereof.

The third propylene polymer (PP3) according to this invention is preferably produced in the presence of
(a) a Ziegler-Natta catalyst (ZN-C2) comprising compounds (TC) of a transition metal of Group 4 to 6 of IUPAC, a Group 2 metal compound (MC) and an internal donor (ID);
(b) optionally a co-catalyst (Co), and
(c) optionally an external donor (ED).

Preferably, the third propylene polymer (PP3) is produced in a sequential polymerization process as further described below comprising at least two reactors (R1) and (R2), in the first reactor (R1) a propylene homopolymer fraction (PP3a) is produced and subsequently transferred into the second reactor (R2), in the second reactor (R2) a second propylene homopolymer fraction (PP3b) is produced in the presence of the first propylene homopolymer fraction (PP3a).

The process for the preparation of the propylene homopolymer as well as the Ziegler-Natta catalyst (ZN-C2) are further described in detail below.

As already indicated above, the third propylene polymer (PP3) is preferably produced in a sequential polymerization process.

The term "sequential polymerization system" indicates that the third propylene polymer (PP3) is produced in at least two reactors connected in series. Accordingly, the present polymerization system comprises at least a first polymerization reactor (R1) and a second polymerization reactor (R2), and optionally a third polymerization reactor (R3). The term "polymerization reactor" shall indicate that the main polymerization takes place. Thus, in case the process consists of two polymerization reactors, this definition does not exclude the option that the overall system comprises for instance a pre-polymerization step in a pre-polymerization reactor. The term "consist of" is only a closing formulation in view of the main polymerization reactors.

Preferably, at least one of the two polymerization reactors (R1) and (R2) is a gas phase reactor (GPR). Still more preferably the second polymerization reactor (R2) and the optional third polymerization reactor (R3) are gas phase reactors (GPRs), i.e. a first gas phase reactor (GPR1) and a second gas phase reactor (GPR2). A gas phase reactor (GPR) according to this invention is preferably a fluidized bed reactor, a fast fluidized bed reactor or a settled bed reactor or any combination thereof.

Accordingly, the first polymerization reactor (R1) is preferably a slurry reactor (SR) and can be any continuous or simple stirred batch tank reactor or loop reactor operating in bulk or slurry. Bulk means a polymerization in a reaction medium that comprises of at least 60% (w/w) monomer.

According to the present invention the slurry reactor (SR) is preferably a (bulk) loop reactor (LR). Accordingly, the average concentration of the first fraction ($1^{st}$ F) of the third propylene polymer (PP3), i.e. the first propylene homopolymer fraction (PP3a), in the polymer slurry within the loop reactor (LR) is typically from 15 wt.-% to 55 wt.-%, based on the total weight of the polymer slurry within the loop reactor (LR). In one preferred embodiment of the present invention the average concentration of the first propylene homopolymer fraction (PP3a) in the polymer slurry within the loop reactor (LR) is from 20 wt.-% to 55 wt.-% and more preferably from 25 wt.-% to 52 wt.-%, based on the total weight of the polymer slurry within the loop reactor (LR).

Preferably the propylene homopolymer of the first polymerization reactor (R1), i.e. the first propylene homopolymer fraction (PP3a), more preferably the polymer slurry of the loop reactor (LR) containing the first propylene homopolymer fraction (PP3a), is directly fed into the second polymerization reactor (R2), i.e. into the (first) gas phase reactor (GPR1), without a flash step between the stages. This kind of direct feed is described in EP 887379 A, EP 887380 A, EP 887381 A and EP 991684 A. By "direct feed" is meant a process wherein the content of the first polymerization reactor (R1), i.e. of the loop reactor (LR), the polymer slurry comprising the first propylene homopolymer fraction (PP3a), is led directly to the next stage gas phase reactor.

Alternatively, the propylene homopolymer of the first polymerization reactor (R1), i.e. the first propylene homopolymer fraction (PP3a), more preferably polymer slurry of the loop reactor (LR) containing the first propylene homopolymer fraction (H-PP1a), may be also directed into a flash step or through a further concentration step before fed into the second polymerization reactor (R2), i.e. into the gas phase reactor (GPR). Accordingly, this "indirect feed" refers to a process wherein the content of the first polymerization reactor (R1), of the loop reactor (LR), i.e. the polymer slurry, is fed into the second polymerization reactor (R2), into the (first) gas phase reactor (GPR1), via a reaction medium separation unit and the reaction medium as a gas from the separation unit.

More specifically, the second polymerization reactor (R2), and any subsequent reactor, for instance the third polymerization reactor (R3), are preferably gas phase reactors (GPRs). Such gas phase reactors (GPR) can be any mechanically mixed or fluid bed reactors. Preferably the gas phase reactors (GPRs) comprise a mechanically agitated fluid bed reactor with gas velocities of at least 0.2 m/sec. Thus it is appreciated that the gas phase reactor is a fluidized bed type reactor preferably with a mechanical stirrer.

Thus, in a preferred embodiment the first polymerization reactor (R1) is a slurry reactor (SR), like loop reactor (LR), whereas the second polymerization reactor (R2) and any optional subsequent reactor, like the third polymerization reactor (R3), are gas phase reactors (GPRs). Accordingly for the instant process at least two, preferably two polymerization reactors (R1) and (R2) or three polymerization reactors (R1), (R2) and (R3), namely a slurry reactor (SR), like loop reactor (LR) and a (first) gas phase reactor (GPR1) and optionally a second gas phase reactor (GPR2), connected in series are used. If needed prior to the slurry reactor (SR) a pre-polymerization reactor is placed.

The Ziegler-Natta catalyst (ZN-C2) is fed into the first polymerization reactor (R1) and is transferred with the polymer (slurry) obtained in the first polymerization reactor (R1) into the subsequent reactors. If the process covers also a pre-polymerization step it is preferred that all of the Ziegler-Natta catalyst (ZN-C2) is fed in the pre-polymerization reactor. Subsequently the pre-polymerization product containing the Ziegler-Natta catalyst (ZN-C2) is transferred into the first polymerization reactor (R1).

A preferred multistage process is a "loop-gas phase"-process, such as developed by Borealis A/S, Denmark (known as BORSTAR® technology) described e.g. in patent literature, such as in EP 0 887 379, WO 92/12182 WO 2004/000899, WO 2 004/111095, WO 99/24478, WO 99/24479 or in WO 00/68315.

A further suitable slurry-gas phase process is the Spheripol® process of Basell.

Especially good results are achieved in case the temperature in the reactors is carefully chosen.

Accordingly it is preferred that the operating temperature in the first polymerization reactor (R1) is in the range of 62 to 90° C., more preferably in the range of 65 to 85° C., still more preferably in the range of 67 to 82° C.

Alternatively or additionally to the previous paragraph it is preferred that the operating temperature in the second polymerization reactor (R2) and optional in the third reactor (R3) is in the range of 62 to 95° C., more preferably in the range of 67 to 92° C.

Preferably the operating temperature in the second polymerization reactor (R2) is equal to or higher than the operating temperature in the first polymerization reactor (R1). Accordingly it is preferred that the operating temperature (a) in the first polymerization reactor (R1) is in the range of 62 to 90° C., more preferably in the range of 65 to 85° C., still more preferably in the range of 67 to 82° C.; and (b) in the second polymerization reactor (R2) is in the range of 75 to 95° C., more preferably in the range of 78 to 92° C., still more preferably in the range of 78 to 88° C., with the proviso that the operating temperature in the in the second polymerization reactor (R2) is equal or higher to the operating temperature in the first polymerization reactor (R1).

Typically the pressure in the first polymerization reactor (R1), preferably in the loop reactor (LR), is in the range from 20 to 80 bar, preferably 30 to 70 bar, like 35 to 65 bar, whereas the pressure in the second polymerization reactor (R2), i.e. in the (first) gas phase reactor (GPR1), and optionally in any subsequent reactor, like in the third polymerization reactor (R3), e.g. in the second gas phase reactor (GPR2), is in the range from 5 to 50 bar, preferably 15 to 40 bar.

Preferably hydrogen is added in each polymerization reactor in order to control the molecular weight, i.e. the melt flow rate $MFR_2$.

Preferably the average residence time is rather long in the polymerization reactors (R1) and (R2). In general, the average residence time ($\tau$) is defined as the ratio of the reaction volume ($V_R$) to the volumetric outflow rate from the reactor ($Q_o$) (i.e. $V_R/Q_o$), i.e $\tau=V_R/Q_o$ [tau=$V_R/Q_o$]. In case of a loop reactor the reaction volume ($V_R$) equals to the reactor volume.

Accordingly the average residence time ($\tau$) in the first polymerization reactor (R1) is preferably at least 15 min, more preferably in the range of 15 to 90 min, still more preferably in the range of 20 to 80 min, like in the range of 24 to 60 min, and/or the average residence time ($\tau$) in the second polymerization reactor (R2) is preferably at least 70 min, more preferably in the range of 70 to 220 min, still more preferably in the range of 80 to 210 min, yet more preferably in the range of 90 to 200 min, like in the range of 90 to 190 min. Preferably the average residence time ($\tau$) in the third polymerization reactor (R3)—if present—is preferably at least 30 min, more preferably in the range of 30 to 120 min, still more preferably in the range of 40 to 100 min, like in the range of 50 to 90 min.

As mentioned above the preparation of the propylene homopolymer can comprise in addition to the (main) polymerization of the propylene homopolymer in the at least two polymerization reactors (R1, R3 and optional R3) prior thereto a pre-polymerization in a pre-polymerization reactor (PR) upstream to the first polymerization reactor (R1).

In the pre-polymerization reactor (PR) a polypropylene (Pre-PP) is produced. The pre-polymerization is conducted in the presence of the Ziegler-Natta catalyst (ZN-C2). According to this embodiment the Ziegler-Natta catalyst (ZN-C2), the co-catalyst (Co), and the external donor (ED) are all introduced to the pre-polymerization step. However, this shall not exclude the option that at a later stage for instance further co-catalyst (Co) and/or external donor (ED) is added in the polymerization process, for instance in the first reactor (R1). In one embodiment the Ziegler-Natta catalyst (ZN-C2), the co-catalyst (Co), and the external donor (ED) are only added in the pre-polymerization reactor (PR), if a pre-polymerization is applied.

The pre-polymerization reaction is typically conducted at a temperature of 0 to 60° C., preferably from 15 to 50° C., and more preferably from 20 to 45° C.

The pressure in the pre-polymerization reactor is not critical but must be sufficiently high to maintain the reaction mixture in liquid phase. Thus, the pressure may be from 20 to 100 bar, for example 30 to 70 bar.

In a preferred embodiment, the pre-polymerization is conducted as bulk slurry polymerization in liquid propylene, i.e. the liquid phase mainly comprises propylene, with optionally inert components dissolved therein. Furthermore, according to the present invention, an ethylene feed is employed during pre-polymerization as mentioned above.

It is possible to add other components also to the pre-polymerization stage. Thus, hydrogen may be added into the pre-polymerization stage to control the molecular weight of the polypropylene (Pre-PP) as is known in the art. Further, antistatic additive may be used to prevent the particles from adhering to each other or to the walls of the reactor.

The precise control of the pre-polymerization conditions and reaction parameters is within the skill of the art.

Due to the above defined process conditions in the pre-polymerization, preferably a mixture (MI) of the Ziegler-Natta catalyst (ZN-C2) and the polypropylene (Pre-PP) produced in the pre-polymerization reactor (PR) is obtained. Preferably the Ziegler-Natta catalyst (ZN-C2) is (finely) dispersed in the polypropylene (Pre-PP). In other words, the Ziegler-Natta catalyst (ZN-C2) particles introduced in the pre-polymerization reactor (PR) split into smaller fragments which are evenly distributed within the growing polypropylene (Pre-PP). The sizes of the introduced Ziegler-Natta catalyst (ZN-C2) particles as well as of the obtained fragments are not of essential relevance for the instant invention and within the skilled knowledge.

As mentioned above, if a pre-polymerization is used, subsequent to said pre-polymerization, the mixture (MI) of the Ziegler-Natta catalyst (ZN-C2) and the polypropylene (Pre-PP) produced in the pre-polymerization reactor (PR) is transferred to the first reactor (R1). Typically the total amount of the polypropylene (Pre-PP) in the final propylene copolymer (R-PP) is rather low and typically not more than 5.0 wt.-%, more preferably not more than 4.0 wt.-%, still more preferably in the range of 0.5 to 4.0 wt.-%, like in the range 1.0 of to 3.0 wt.-%.

In case that pre-polymerization is not used, propylene and the other ingredients such as the Ziegler-Natta catalyst (ZN-C2) are directly introduced into the first polymerization reactor (R1).

Accordingly, the propylene homopolymer is preferably produced in a process comprising the following steps under the conditions set out above (a) in the first polymerization reactor (R1), i.e. in a loop reactor (LR), propylene is polymerized obtaining a first propylene homopolymer fraction (PP3a) of the third propylene polymer (PP3), (b) transferring said first propylene homopolymer fraction (PP3a) to a second polymerization reactor (R2), (c) in the second polymerization reactor (R2) propylene is polymerized in the presence of the first propylene homopolymer fraction (PP3a) obtaining a second propylene homopolymer fraction (PP3b) of the third propylene polymer (PP3), said first propylene homopolymer fraction (PP3a) and said second propylene homopolymer fraction (PP3b) form the third propylene polymer (PP3).

A pre-polymerization as described above can be accomplished prior to step (a).

The catalyst used in the present invention is a solid Ziegler-Natta catalyst (ZN-C2), which comprises compounds (TC) of a transition metal of Group 4 to 6 of IUPAC, like titanium, a Group 2 metal compound (MC), like a magnesium, and an internal donor (ID) being a phthalate or preferably a non-phthalic compound, preferably a non-phthalic acid ester, still more preferably being a diester of non-phthalic dicarboxylic acids as described in more detail below. Thus, the catalyst is in a preferred embodiment fully free of undesired phthalic compounds. Further, the solid catalyst is free of any external support material, like silica or $MgCl_2$, but the catalyst is self-supported.

The Ziegler-Natta catalyst (ZN-C2) can be further defined by the way as obtained. Accordingly, the Ziegler-Natta catalyst (ZN-C2) is preferably obtained by a process comprising the steps of a)

a1) providing a solution of at least a Group 2 metal alkoxy compound (Ax) being the reaction product of a Group 2 metal compound (MC) and a monohydric alcohol (A) comprising in addition to the hydroxyl moiety at least one ether moiety optionally in an organic liquid reaction medium; or a2) a solution of at least a Group 2 metal alkoxy compound (Ax') being the reaction product of a Group 2 metal compound (MC) and an alcohol mixture of the monohydric alcohol (A) and a monohydric alcohol (B) of formula ROH, optionally in an organic liquid reaction medium; or a3) providing a solution of a mixture of the Group 2 metal alkoxy compound (Ax) and a Group 2 metal alkoxy compound (Bx) being the reaction product of a Group 2 metal compound (MC) and the monohydric alcohol (B), optionally in an organic liquid reaction medium; or a4) providing a solution of Group 2 metal alkoxy compound of formula $M(OR^1)_n(OR^2)_m X_{2-n-m}$ or mixture of Group 2 alkoxides $M(OR^1)_n X_{2-n'}$ and $M(OR^2)_m X_{2-m'}$, where M is Group 2 metal, X is halogen, $R^1$ and $R^2$ are different alkyl groups of $C_2$ to $C_{16}$ carbon atoms, and $0 \leq n<2$, $0 \leq m<2$ and $n+m+(2-n-m)=2$, provided that both n and $m \neq 0$, $0<n'<2$ and $0<m'<2$; and b) adding said solution from step a) to at least one compound (TC) of a transition metal of Group 4 to 6 and c) obtaining the solid catalyst component particles, and adding an internal electron donor (ID), preferably a non-phthalic internal donor (ID), at any step prior to step c).

The internal donor (ID) or precursor thereof is thus added preferably to the solution of step a) or to the transition metal compound before adding the solution of step a).

According to the procedure above the Ziegler-Natta catalyst (ZN-C) can be obtained via precipitation method or via emulsion-solidification method depending on the physical conditions, especially temperature used in steps b) and c). Emulsion is also called in this application liquid/liquid two-phase system.

In both methods (precipitation or emulsion-solidification) the catalyst chemistry is the same.

In precipitation method combination of the solution of step a) with at least one transition metal compound (TC) in step b) is carried out and the whole reaction mixture is kept at least at 50° C., more preferably in the temperature range of 55 to 110° C., more preferably in the range of 70 to 100° C., to secure full precipitation of the catalyst component in form of a solid particles (step c).

In emulsion—solidification method in step b) the solution of step a) is typically added to the at least one transition metal compound (TC) at a lower temperature, such as from −10 to below 50° C., preferably from −5 to 30° C. During agitation of the emulsion the temperature is typically kept at −10 to below 40° C., preferably from −5 to 30° C. Droplets of the dispersed phase of the emulsion form the active catalyst composition. Solidification (step c) of the droplets is suitably carried out by heating the emulsion to a temperature of 70 to 150° C., preferably to 80 to 110° C.

The catalyst prepared by emulsion—solidification method is preferably used in the present invention.

In a preferred embodiment in step a) the solution of a2) or a3) are used, i.e. a solution of (Ax') or a solution of a mixture of (Ax) and (Bx), especially the solution of a2).

Preferably the Group 2 metal (MC) is magnesium.

The magnesium alkoxy compounds as defined above can be prepared in situ in the first step of the catalyst preparation process, step a), by reacting the magnesium compound with the alcohol(s) as described above, or said magnesium alkoxy compounds can be separately prepared magnesium alkoxy compounds or they can be even commercially available as ready magnesium alkoxy compounds and used as such in the catalyst preparation process of the invention.

Illustrative examples of alcohols (A) are glycol monoethers. Preferred alcohols (A) are $C_2$ to $C_4$ glycol monoethers, wherein the ether moieties comprise from 2 to 18 carbon atoms, preferably from 4 to 12 carbon atoms. Preferred examples are 2-(2-ethylhexyloxy)ethanol, 2-butyloxy ethanol, 2-hexyloxy ethanol and 1,3-propylene-glycol-monobutyl ether, 3-butoxy-2-propanol, with 2-(2-ethylhexyloxy)ethanol and 1,3-propylene-glycol-monobutyl ether, 3-butoxy-2-propanol being particularly preferred.

Illustrative monohydric alcohols (B) are of formula ROH, with R being straight-chain or branched $C_2$-$C_{16}$ alkyl residue, preferably $C_4$ to $C_{10}$, more preferably $C_6$ to $C_8$ alkyl residue. The most preferred monohydric alcohol is 2-ethyl-1-hexanol or octanol.

Preferably a mixture of Mg alkoxy compounds (Ax) and (Bx) or mixture of alcohols (A) and (B), respectively, are used and employed in a mole ratio of Bx:Ax or B:A from 10:1 to 1:10, more preferably 6:1 to 1:6, most preferably 4.1 to 1:4.

Magnesium alkoxy compound may be a reaction product of alcohol(s), as defined above, and a magnesium compound selected from dialkyl magnesium, alkyl magnesium alkoxides, magnesium dialkoxides, alkoxy magnesium halides and alkyl magnesium halides. Further, magnesium dialkoxides, magnesium diaryloxides, magnesium aryloxyhalides, magnesium aryloxides and magnesium alkyl aryloxides can be used. Alkyl groups can be a similar or different $C_1$-$C_{20}$ alkyl, preferably $C_2$-$C_{10}$ alkyl. Typical alkyl-alkoxy magnesium compounds, when used, are ethyl magnesium butoxide, butyl magnesium pentoxide, octyl magnesium butoxide and octyl magnesium octoxide. Preferably the dialkyl magnesium are used. Most preferred dialkyl magnesium are butyl octyl magnesium or butyl ethyl magnesium.

It is also possible that magnesium compound can react in addition to the alcohol (A) and alcohol (B) also with a polyhydric alcohol (C) of formula R" (OH)m to obtain said magnesium alkoxide compounds. Preferred polyhydric alcohols, if used, are alcohols, wherein R" is a straight-chain, cyclic or branched $C_2$ to $C_{10}$ hydrocarbon residue, and m is an integer of 2 to 6.

The magnesium alkoxy compounds of step a) are thus selected from the group consisting of magnesium dialkoxides, diaryloxy magnesium, alkyloxy magnesium halides, aryloxy magnesium halides, alkyl magnesium alkoxides, aryl magnesium alkoxides and alkyl magnesium aryloxides. In addition a mixture of magnesium dihalide and a magnesium dialkoxide can be used.

The solvents to be employed for the preparation of the present catalyst may be selected among aromatic and aliphatic straight chain, branched and cyclic hydrocarbons with 5 to 20 carbon atoms, more preferably 5 to 12 carbon atoms, or mixtures thereof. Suitable solvents include benzene, toluene, cumene, xylene, pentane, hexane, heptane, octane and nonane.

Hexanes and pentanes are particular preferred. The reaction for the preparation of the magnesium alkoxy compound may be carried out at a temperature of 40° to 70° C. Most suitable temperature is selected depending on the Mg compound and alcohol(s) used.

The transition metal compound of Group 4 to 6 is preferably a titanium compound, most preferably a titanium halide, like $TiCl_4$.

The internal donor (ID) used in the preparation of the catalyst used in the present invention is preferably selected from (di)esters of non-phthalic carboxylic (di)acids, 1,3-diethers, derivatives and mixtures thereof. Especially preferred donors are diesters of mono-unsaturated dicarboxylic acids, in particular esters belonging to a group comprising malonates, maleates, succinates, citraconates, glutarates, cyclohexene-1,2-dicarboxylates and benzoates, and any derivatives and/or mixtures thereof. Preferred examples are e.g. substituted maleates and citraconates, most preferably citraconates.

In emulsion method, the two phase liquid-liquid system may be formed by simple stirring and optionally adding (further) solvent(s) and additives, such as the turbulence minimizing agent (TMA) and/or the emulsifying agents and/or emulsion stabilizers, like surfactants, which are used in a manner known in the art for facilitating the formation of and/or stabilize the emulsion. Preferably, surfactants are acrylic or methacrylic polymers. Particular preferred are unbranched $C_{12}$ to $C_{20}$ (meth)acrylates such as poly(hexadecyl)-methacrylate and poly(octadecyl)-methacrylate and mixtures thereof. Turbulence minimizing agent (TMA), if used, is preferably selected from α-olefin polymers of α-olefin monomers with 6 to 20 carbon atoms, like polyoctene, polynonene, polydecene, polyundecene or polydodecene or mixtures thereof. Most preferable it is polydecene.

The solid particulate product obtained by precipitation or emulsion—solidification method may be washed at least once, preferably at least twice, most preferably at least three times with an aromatic and/or aliphatic hydrocarbons, preferably with toluene, heptane or pentane and or with $TiCl_4$. Washing solutions can also contain donors and/or compounds of Group 13, like trialkyl aluminium, halogenated alkyl aluminium compounds or alkoxy aluminium compounds. Aluminium compounds can also be added during the catalyst synthesis. The catalyst can further be dried, as by evaporation or flushing with nitrogen, or it can be slurried to an oily liquid without any drying step.

The finally obtained Ziegler-Natta catalyst is desirably in the form of particles having generally an average particle size range of 5 to 200 μm, preferably 10 to 100. Particles are compact with low porosity and have surface area below 20 $g/m^2$, more preferably below 10 $g/m^2$. Typically the amount of Ti is 1 to 6 wt-%, Mg 10 to 20 wt-% and donor 10 to 40 wt-% of the catalyst composition.

Detailed description of preparation of catalysts is disclosed in WO 2012/007430, EP2610271, EP 2610270 and EP2610272 which are incorporated here by reference.

The Ziegler-Natta catalyst (ZN-C2) is preferably used in association with an alkyl aluminum cocatalyst and optionally external donors.

As further component in the instant polymerisation process an external donor (ED) is preferably present. Suitable external donors (ED) include certain silanes, ethers, esters, amines, ketones, heterocyclic compounds and blends of these. It is especially preferred to use a silane. It is most preferred to use silanes of the general formula

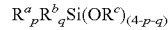

$$R^a_p R^b_q Si(OR^c)_{(4-p-q)}$$

wherein $R^a$, $R^b$ and $R^c$ denote a hydrocarbon radical, in particular an alkyl or cycloalkyl group, and wherein p and q are numbers ranging from 0 to 3 with their sum p+q being equal to or less than 3. $R^a$, $R^b$ and R can be chosen independently from one another and can be the same or different. Specific examples of such silanes are (tert-butyl)$_2$Si(OCH$_3$)$_2$, (cyclohexylxmethyl)Si(OCH$_3$)$_2$, (phenyl)$_2$Si(OCH$_3$)$_2$ and (cyclopentyl)$_2$Si(OCH$_3$)$_2$, or of general formula

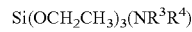

$$Si(OCH_2CH_3)_3(NR^3R^4)$$

wherein $R^3$ and $R^4$ can be the same or different a represent a hydrocarbon group having 1 to 12 carbon atoms.

$R^3$ and $R^4$ are independently selected from the group consisting of linear aliphatic hydrocarbon group having 1 to 12 carbon atoms, branched aliphatic hydrocarbon group having 1 to 12 carbon atoms and cyclic aliphatic hydrocarbon group having 1 to 12 carbon atoms. It is in particular preferred that $R^3$ and $R^4$ are independently selected from the group consisting of methyl, ethyl, n-propyl, n-butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl.

More preferably both $R^3$ and $R^4$ are the same, yet more preferably both $R^3$ and $R^4$ are an ethyl group.

Especially preferred external donors (ED) are the pentyl dimethoxy silane donor (D-donor) or the cyclohexylmethyl dimethoxy silane donor (C-Donor).

In addition to the Ziegler-Natta catalyst (ZN-C2) and the optional external donor (ED) a co-catalyst can be used. The co-catalyst is preferably a compound of group 13 of the periodic table (IUPAC), e.g. organo aluminum, such as an aluminum compound, like aluminum alkyl, aluminum halide or aluminum alkyl halide compound. Accordingly, in one specific embodiment the co-catalyst (Co) is a trialkylaluminium, like triethylaluminium (TEAL), dialkyl aluminium chloride or alkyl aluminium dichloride or mixtures thereof. In one specific embodiment the co-catalyst (Co) is triethylaluminium (TEAL).

Preferably the ratio between the co-catalyst (Co) and the external donor (ED) [Co/ED] and/or the ratio between the co-catalyst (Co) and the transition metal (TM) [Co/TM] should be carefully chosen.

Accordingly, the mol-ratio of co-catalyst (Co) to external donor (ED) [Co/ED] must be in the range of 5 to 45, preferably is in the range of 5 to 35, more preferably is in the range of 5 to 25; and optionally (b) the mol-ratio of co-catalyst (Co) to titanium compound (TC) [Co/TC] must be in the range of above 80 to 500, preferably is in the range of 100 to 350, still more preferably is in the range of 120 to 300.

As mentioned above the Ziegler-Natta catalyst (ZN-C2) is preferably modified by the so called BNT-technology during the above described pre-polymerisation step in order to introduce the polymeric nucleating agent.

Such a polymeric nucleating agent is as described above a vinyl polymer, such as a vinyl polymer derived from monomers of the formula

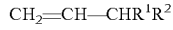

$CH_2=CH-CHR^1R^2$ wherein $R^1$ and $R^2$, together with the carbon atom they are attached to, form an optionally substituted saturated or unsaturated or aromatic ring or a fused ring system, wherein the ring or fused ring moiety contains four to 20 carbon atoms, preferably 5 to 12 membered saturated or unsaturated or aromatic ring or a fused ring system or independently represent a linear or branched $C_4$-$C_{30}$ alkane, $C_4$-$C_{20}$ cycloalkane or $C_4$-$C_{20}$ aromatic ring. Preferably R and $R^2$, together with the C-atom wherein they are attached to, form a five- or six-membered saturated or unsaturated or aromatic ring or independently represent a lower alkyl group comprising from 1 to 4 carbon atoms. Preferred vinyl compounds for the preparation of a polymeric nucleating agent to be used in accordance with the present invention are in particular vinyl cycloalkanes, in particular vinyl cyclohexane (VCH), vinyl cyclopentane, and vinyl-2-methyl cyclohexane, 3-methyl-1-butene, 3-ethyl-1-hexene, 3-methyl-1-pentene, 4-methyl-1-pentene or mixtures thereof. VCH is a particularly preferred monomer.

The weight ratio of vinyl compound to polymerisation catalyst in the modification step of the polymerisation catalyst preferably is 0.3 or more up to 40, such as 0.4 to 20 or more preferably 0.5 to 15, like 0.5 to 2.0.

The polymerisation of the vinyl compound, e. g. VCH, can be done in any inert fluid that does not dissolve the polymer formed (e. g. polyVCH). It is important to make sure that the viscosity of the final catalyst/polymerised vinyl compound/inert fluid mixture is sufficiently high to prevent the catalyst particles from settling during storage and transport.

The Elastomeric Ethylene Copolymer (E)

The fiber reinforced polypropylene composition (C) according to the instant invention further comprises an elastomeric ethylene copolymer (E).

Preferably, the elastomeric ethylene copolymer (E) is a very low density polyolefin, more preferably a very low density polyolefin polymerized using single site, preferably metallocene catalysis.

In a preferred embodiment, the elastomeric ethylene copolymer (E) has a density below 0.900 g/cm³. More preferably, the density of the elastomeric ethylene copolymer (E) is equal or below 0.890 g/cm³, still more preferably in the range of 0.845 to 0.890 g/cm³, like in the range of 0.870 to 0.885 g/cm³.

Preferably, the elastomeric ethylene copolymer (E) has a melt flow rate $MFR_2$ (190° C., 2.16 kg) of at least 25 g/10 min, more preferably from 25 to 50 g/10 min, still more preferably from 28 to 40 g/10 min, like a range from 29 to 35 g/10 min.

The elastomeric ethylene copolymer (E) comprises units derived from ethylene and a C4 to C10 α-olefin.

The elastomeric ethylene copolymer (E) comprises, preferably consists of, units derivable from (i) ethylene and (ii) at least another C4 to C10 α-olefin, more preferably units derivable from (i) ethylene and (ii) at least another α-olefin selected form the group consisting of 1-butene, 1-pentene, 1-hexene, 1-heptene and 1-octene. It is especially preferred that the elastomeric ethylene copolymer (E) comprises at least units derivable from (i) ethylene and (ii) 1-butene or 1-octene.

In an especially preferred embodiment, the elastomeric ethylene copolymer (E) consists of units derivable from (i) ethylene and (ii) 1-butene or 1-octene. In particular, it is preferred that the elastomeric ethylene copolymer (E) is a copolymer of ethylene and 1-octene.

The comonomer content, like the C4 to C20 α-olefin content, of the elastomeric ethylene copolymer (E) is in the range of 4 to 25 mol-%, more preferably in the range of 5 to 20 mol-%, still more preferably in the range of 6 to 12 mol-%, like in the range of 5 to 10 mol-%.

In one preferred embodiment the elastomeric ethylene copolymer (E) is prepared with at least one metallocene catalyst. The elastomeric ethylene copolymer (E) may also be prepared with more than one metallocene catalyst or may be a blend of multiple elastomers prepared with different metallocene catalysts. In some embodiments, the elastomeric ethylene copolymer (E) is a substantially linear ethylene polymer (SLEP). SLEPs and other metallocene catalysed elastomeric ethylene copolymer (E) are known in the art, for example, U.S. Pat. No. 5,272,236. These resins are also commercially available, for example, as Queo™ plastomers available from *Borealis*, ENGAGE™ plastomer resins available from Dow Chemical Co., EXACT™ polymers from Exxon or TAFMER™ polymers from Mitsui, Lucene polymers from LG, Fortify polymers from Sabic or Solumer polymers from SK Chemicals.

The Adhesion Promoter (AP)

In accordance with the present invention, the fiber reinforced polypropylene composition (C) further comprises an adhesion promoter (AP). The adhesion promoter (AP) is specified as being a polar modified polypropylene (PM-PP) homo- or copolymer.

The polar modified polypropylene (PM-PP) homo- or copolymer comprises a low molecular weight compound having reactive polar groups. Modified polypropylene homopolymers and copolymers, like copolymers of propylene and ethylene or with other α-olefins, e.g. $C_4$ to $C_{10}$ α-olefins, are most preferred, as they are highly compatible with the propylene polymer (PP) of the inventive fiber reinforced polypropylene composition (C).

In terms of structure, the polar modified polypropylene (PM-PP) homo- or copolymer are preferably selected from graft homo- or copolymers.

In this context, preference is given to polar modified polypropylene (PM-PP) homo- or copolymers containing groups derived from polar compounds, in particular selected from the group consisting of acid anhydrides, carboxylic acids, carboxylic acid derivatives, primary and secondary amines, hydroxyl compounds, oxazoline and epoxides, and also ionic compounds.

Specific examples of said polar compounds are unsaturated cyclic anhydrides and their aliphatic diesters, and the diacid derivatives. In particular, one can use maleic anhydride and compounds selected from $C_1$ to $C_{10}$ linear and branched dialkyl maleates, $C_1$ to $C_{10}$ linear and branched dialkyl fumarates, itaconic anhydride, $C_1$ to $C_{10}$ linear and branched itaconic acid dialkyl esters, acrylic acid, maleic acid, fumaric acid, itaconic acid and mixtures thereof.

Particular preference is given to use a polypropylene homo- or copolymer grafted with maleic anhydride or acrylic acid as the polar modified polypropylene (PM-PP) homo- or copolymer, i.e. the adhesion promoter (AP).

The modified polymer, i.e. the adhesion promoter, can be produced in a simple manner by reactive extrusion of the polymer, for example with maleic anhydride or acrylic acid in the presence of free radical generators (like organic peroxides), as disclosed for instance in U.S. Pat. Nos. 4,506,056, 4,753,997 or EP 1 805 238.

Preferred amounts of groups derived from polar compounds in the polar modified polypropylene (PM-PP) homo- or copolymer, i.e. the adhesion promoter (AP), are from 0.5 to 10 wt.-%. For example, in the range of 0.5 wt.-% to 8 wt.-%, preferable in the range of 0.5 wt.-% to 6 wt.-%, more preferably in the range of 0.5 wt.-% to 4 wt.-% and most preferably in the range of 0.5 wt.-% to 3.5 wt.-%.

Preferred values of the melt flow rate $MFR_2$ (190° C.) for the polar modified polypropylene (PM-PP) homo- or copolymer, i.e. for the adhesion promoter (AP), are from 2 to 500 g/10 min. It is particularly preferred that the polar modified polypropylene (PM-PP) homo- or copolymer has a melt flow rate $MFR_2$ (190° C.) of at least 50 g/10 min.

In one preferred embodiment of the present invention, the adhesion promoter (AP) is a maleic anhydride modified polypropylene homo- or copolymer and/or an acrylic acid modified polypropylene homo- or copolymer. Preferably, the adhesion promoter (AP) is a maleic anhydride modified polypropylene homopolymer and/or an acrylic acid modified polypropylene homopolymer and preferably a maleic anhydride modified polypropylene homopolymer. For example, suitable polar modified polypropylene (PM-PP) homo- or copolymers include, for example, a polypropylene homopolymer grafted with maleic anhydride (PP-g-MAH) and a polypropylene homopolymer grafted with acrylic acid (PP-g-AA).

The Short Fibers (SF)

Essential components of the present fiber reinforced polypropylene composition (C) are the short fibers (SF).

The short fibers (SF) are selected from the group consisting of glass fibers, metal fibers, mineral fibers, ceramic fibers, carbon fibers and graphite fibers. Glass fibers are preferred. In particular, the glass fibers are cut glass fibers, also known as short fibers or chopped strands.

The cut or short fibers (SF) used in the fiber reinforced polypropylene composition (C) preferably have an average length in the range of from 1.0 to 10.0 mm, more preferably in the range of 2.0 to 8.0 mm, still more preferably in the range of 3.0 to 5.0 mm, like in the range of 3.0 to 4.5 mm.

The cut or short fibers (SF) used in the fiber reinforced polypropylene composition (C) preferably have an average diameter of from 8 to 20 μm, more preferably from 9 to 16 μm, still more preferably 10 to 14 μm, like 9 to 13 μm.

Preferably, the short fibers (SF) have an aspect ratio of 125 to 650, preferably of 150 to 450, more preferably 200 to 470, still more preferably 300 to 430. The aspect ratio is the relation between average length and average diameter of the fibers.

The Additives (AD)

In addition to the propylene polymer (PP), the elastomeric ethylene copolymer (E), the adhesion promoter (AP) and the short fibers (SF), the fiber reinforced polypropylene composition (C) of the invention may include additives (AD). Typical additives are acid scavengers, antioxidants, colorants, light stabilisers, plasticizers, slip agents, anti-scratch agents, dispersing agents, processing aids, lubricants, pigments, and the like.

Such additives are commercially available and for example described in "Plastic Additives Handbook", $6^{th}$ edition 2009 of Hans Zweifel (pages 1141 to 1190).

Furthermore, the term "additives (AD)" according to the present invention also includes carrier materials, in particular polymeric carrier materials.

The Polymeric Carrier Material

Preferably the fiber reinforced polypropylene composition (C) of the invention does not comprise (a) further polymer (s) different to the propylene polymer (PP), the elastomeric ethylene copolymer (E) and the adhesion promoter (AP), in an amount exceeding 15 wt.-%, preferably in an amount exceeding 10 wt.-%, more preferably in an amount exceeding 9 wt.-%, based on the weight of the fiber reinforced polypropylene composition (C). Any polymer being a carrier material for additives (AD) is not calculated to the amount of polymeric compounds as indicated in the present invention, but to the amount of the respective additive.

The polymeric carrier material of the additives (AD) is a carrier polymer to ensure a uniform distribution in the fiber reinforced polypropylene composition (C) of the invention. The polymeric carrier material is not limited to a particular polymer. The polymeric carrier material may be ethylene homopolymer, ethylene copolymer obtained from ethylene and α-olefin comonomer such as $C_3$ to $C_8$ α-olefin comonomer, propylene homopolymer and/or propylene copolymer obtained from propylene and α-olefin comonomer such as ethylene and/or $C_4$ to $C_8$ α-olefin comonomer. It is preferred that the polymeric carrier material does not contain monomeric units derivable from styrene or derivatives thereof.

The Article

The present invention also relates to an injection molded article, like an injection molded automotive article, comprising the fiber reinforced polypropylene composition (C) as defined above. The present invention in particular relates to an injection molded article, like an injection molded automotive article, comprising at least 60 wt.-%, more preferably at least 80 wt.-%, still more preferably at least 90 wt.-%, like at least 95 wt.-% or at least 99 wt.-%, of the fiber reinforced polypropylene composition (C) as defined above. In an especially preferred embodiment the present invention relates to an injection molded article, like an injection molded automotive article, consisting of the fiber reinforced polypropylene composition (C) as defined above.

Further, the present invention is directed to the following embodiments:

Embodiment 1

Granules comprising a fiber reinforced composition (C), comprising
i) a propylene polymer (PP),
ii) an elastomeric ethylene copolymer (E),
iii) an adhesion promoter (AP), and
iv) short fibers (SF),
wherein said fiber reinforced composition (C) fulfils in-equation (I)

$$\frac{w(PP)}{w(E)} > 2.0, \qquad (I)$$

wherein w(PP) is the weight fraction [in wt.-%] of the propylene polymer (PP), based on the overall weight of the polypropylene composition (C), and w(E) is the weight fraction [in wt.-%] of the elastomeric ethylene copolymer (E), based on the overall weight of the fiber reinforced composition (C).

Embodiment 2

Granules according to embodiment 1, wherein the fiber reinforced composition (C) fulfils in-equation (II)

$$\frac{w(SF)}{w(E)} > 3.3, \qquad (II)$$

wherein w(SF) is the weight fraction [in wt.-%] of the short fibers (SF), based on the overall weight of the polypropylene composition (C), and w(E) is the weight fraction [in wt.-%] of the elastomeric ethylene copolymer (E), based on the overall weight of the fiber reinforced composition (C).

Embodiment 3

Granules according to embodiment 1 or 2, wherein the elastomeric ethylene copolymer (E) is a copolymer of ethylene and a $C_4$-$C_{10}$ α-olefin.

Embodiment 4

Granules according to any one of the preceding embodiments, wherein the fiber reinforced composition (C) has a melt flow rate $MFR_2$ (230° C., 2.16 kg) determined according to ISO 1133 below 100.0 g/10 min.

Embodiment 5

Granules according to any one of the preceding embodiments, wherein the fiber reinforced composition (C) comprises
i) 20.0 to 70.0 wt.-% of the propylene polymer (PP),
ii) 2.0 to 12.0 wt.-% of the elastomeric ethylene copolymer (E),
iii) 0.1 to 5.0 wt.-% of the adhesion promoter (AP), and
iv) 10.0 to 70.0 wt.-% of the short fibers (SF),
based on the overall weight of the fiber reinforced composition (C).

Embodiment 6

Granules according to any one of the preceding embodiments, wherein the adhesion promoter (AP) is a polar modified polypropylene (PM-PP) being a propylene homo- or copolymer grafted with maleic anhydride having a melt flow rate MFR (190° C., 2.16 kg) determined according to ISO 1133 of at least 50.0 g/10 min.

Embodiment 7

Granules according to any one of the preceding embodiments, wherein the elastomeric ethylene copolymer (E) has a melt flow rate MFR (190° C., 2.16 kg) determined according to ISO 1133 of at least 25.0 g/10 min.

Embodiment 8

Granules according to any one of the preceding embodiments, wherein the elastomeric ethylene copolymer (E) has
a) a comonomer content of 2.0 to 25.0 mol-%, and/or
b) a density below 0.900 g/cm³.

Embodiment 9

Granules according to any one of the preceding embodiments, wherein the elastomeric ethylene copolymer (E) is a copolymer of ethylene and 1-octene.

Embodiment 10

Granules according to any one of the preceding embodiments, wherein the propylene polymer (PP) is a propylene homopolymer.

Embodiment 11

Granules according to any one of the preceding embodiments, wherein the propylene polymer (PP) is at least bimodal.

Embodiment 12

Granules according to any one of the preceding embodiments, wherein the propylene polymer (PP) comprises
i) 10.0 to 35.0 wt.-% of a first propylene polymer (PP1),
ii) 30.0 to 70.0 wt.-% of a second propylene polymer (PP2), and
iii) 10.0 to 35.0 wt.-% of a third propylene polymer (PP3),
based on the overall weight of the propylene polymer (PP), wherein said first propylene polymer (PP1), said second propylene polymer (PP2) and said third propylene polymer (PP3) have different melt flow rates $MFR_2$ (230° C., 2.16 kg) determined according to ISO 1133.

Embodiment 13

Granules according to any one of the preceding embodiments, wherein the short fibers (SF) are selected from the group consisting of glass fibers, metal fibers, ceramic fibers, carbon fibers and graphite fibers, preferably the short fibers (SF) are glass fibers.

Embodiment 14

Granules according to any one of the preceding embodiments, wherein the short fibers (SF), preferably short glass fibers (SGF) have
i) an average length of 1.0 to 10.0 mm, and/or
ii) an average diameter of 8 to 20 m.

Embodiment 15

Granules according to any one of the preceding embodiments, comprising at least 80.0 wt.-% of the fiber reinforced polypropylene composition (C), based on the overall weight of the granules.

Embodiment 16

Article, preferably moulded article, comprising the fiber reinforced polypropylene composition (C) according to any one of embodiments 1 to 15.

The present invention will now be described in further detail by the examples provided below.

EXAMPLES

1. Measuring Methods

MFR$_2$ (230° C.) is measured according to ISO 1133 (230° C., 2.16 kg load).

MFR$_2$ (190° C.) is measured according to ISO 1133 (190° C., 2.16 kg load).

The melt flow rate MFR$_2$ (230° C.) of the propylene polymer (PP) is calculated according to equation (I)

$$\log MFR(PP) = w(PP1)\cdot\log MFR(PP1) w(PP2)\cdot\log MFR(PP2) + w(PP3)\cdot\log MFR(PP3) \qquad (I),$$

Wherein w(PP1) is the weight fraction of the first propylene polymer (PP1)

w(PP2) is the weight fraction of the second propylene polymer (PP2)

w(PP3) is the weight fraction of the third propylene polymer (PP3)

MFR(PP1) is the melt flow rate MFR$_2$ (230° C., 2.16 kg) in g/10 min of the first propylene polymer (PP1)

MFR(PP2) is the melt flow rate MFR$_2$ (230° C., 2.16 kg) in g/10 min of the second propylene polymer (PP2), MFR(PP3) is the melt flow rate MFR$_2$ (230° C., 2.16 kg) in g/10 min of the third propylene polymer (PP3), and MFR(PP) is the melt flow rate MFR$_2$ (230° C., 2.16 kg) in g/10 min of the propylene polymer (PP)

Quantification of Microstructure by NMR Spectroscopy

Quantitative nuclear-magnetic resonance (NMR) spectroscopy was used to quantify the comonomer content and comonomer sequence distribution of the polymers. Quantitative $^{13}$C{$^1$H} NMR spectra were recorded in the solution-state using a Bruker Advance III 400 NMR spectrometer operating at 400.15 and 100.62 MHz for $^1$H and $^{13}$C respectively. All spectra were recorded using a $^{13}$C optimised 10 mm extended temperature probehead at 125° C. using nitrogen gas for all pneumatics. Approximately 200 mg of material was dissolved in 3 ml of 1,2-tetrachloroethane-d$_2$ (TCE-d$_2$) along with chromium-(III)-acetylacetonate (Cr(cac)$_3$) resulting in a 65 mM solution of relaxation agent in solvent (Singh, G., Kothari, A., Gupta, V., Polymer Testing 28 5 (2009), 475). To ensure a homogenous solution, after initial sample preparation in a heat block, the NMR tube was further heated in a rotatary oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 1128). A total of 6144 (6 k) transients were acquired per spectra. Quantitative $^{13}$C{$^1$H} NMR spectra were processed, integrated and relevant quantitative properties determined from the integrals using proprietary computer programs. All chemical shifts were indirectly referenced to the central methylene group of the ethylene block (EEE) at 30.00 ppm using the chemical shift of the solvent. This approach allowed comparable referencing even when this structural unit was not present. Characteristic signals corresponding to the incorporation of ethylene were observed Cheng, H. N., Macromolecules 17 (1984), 1950).

For polypropylene homopolymers all chemical shifts are internally referenced to the methyl isotactic pentad (mmmm) at 21.85 ppm.

Characteristic signals corresponding to regio defects (Resconi, L., Cavallo, L., Fait, A., Piemontesi, F., Chem. Rev. 2000, 100, 1253; Wang, W-J., Zhu, S., Macromolecules 33 (2000), 1157; Cheng, H. N., Macromolecules 17 (1984), 1950) or comonomer were observed.

The tacticity distribution was quantified through integration of the methyl region between 23.6-19.7 ppm correcting for any sites not related to the stereo sequences of interest (Busico, V., Cipullo, R., Prog. Polym. Sci. 26 (2001) 443; Busico, V., Cipullo, R., Monaco, G., Vacatello, M., Segre, A. L., Macromoleucles 30 (1997) 6251).

Specifically the influence of regio defects and comonomer on the quantification of the tacticity distribution was corrected for by subtraction of representative regio defect and comonomer integrals from the specific integral regions of the stereo sequences.

The isotacticity was determined at the pentad level and reported as the percentage of isotactic pentad (mmmm) sequences with respect to all pentad sequences:

[mmmm]%=100*(mmmm/sum of all pentads)

The presence of 2,1 erythro regio defects was indicated by the presence of the two methyl sites at 17.7 and 17.2 ppm and confirmed by other characteristic sites.

Characteristic signals corresponding to other types of regio defects were not observed (Resconi, L., Cavallo, L., Fait, A., Piemontesi, F., Chem. Rev. 2000, 100, 1253).

The amount of 2,1 erythro regio defects was quantified using the average integral of the two characteristic methyl sites at 17.7 and 17.2 ppm:

$$P_{21e} = (I_{e6} + I_{e8})/2$$

The amount of 1,2 primary inserted propene was quantified based on the methyl region with correction undertaken for sites included in this region not related to primary insertion and for primary insertion sites excluded from this region:

$$P_{12} = I_{CH3} + P_{12e}$$

The total amount of propene was quantified as the sum of primary inserted propene and all other present regio defects:

$$P_{total} = P_{12} + P_{21e}$$

The mole percent of 2,1 erythro regio defects was quantified with respect to all propene:

[21e] mol %=100*($P_{21e}/P_{total}$)

For copolymers characteristic signals corresponding to the incorporation of ethylene were observed (Cheng, H. N., Macromolecules 17 (1984), 1950).

With regio defects also observed (Resconi, L., Cavallo, L., Fait, A., Piemontesi, F., Chem. Rev. 2000, 100, 1253; Wang, W-J., Zhu, S., Macromolecules 33 (2000), 1157; Cheng, H. N., Macromolecules 17 (1984), 1950) correction for the influence of such defects on the comonomer content was required.

The comonomer fraction was quantified using the method of Wang et. al. (Wang, W-J., Zhu, S., Macromolecules 33 (2000), 1157) through integration of multiple signals across the whole spectral region in the $^{13}$C{$^1$H} spectra. This method was chosen for its robust nature and ability to account for the presence of regio-defects when needed. Integral regions were slightly adjusted to increase applicability across the whole range of encountered comonomer contents.

For systems where only isolated ethylene in PPEPP sequences was observed the method of Wang et. al. was modified to reduce the influence of non-zero integrals of sites that are known to not be present. This approach reduced the overestimation of ethylene content for such systems and was achieved by reduction of the number of sites used to determine the absolute ethylene content to:

$$E=0.5(S\beta\beta+S\beta\gamma+S\beta\delta+0.5(S\alpha\beta+S\alpha\gamma))$$

Through the use of this set of sites the corresponding integral equation becomes:

$$E=0.5(I_H+I_G+0.5(I_C+I_D))$$

using the same notation used in the article of Wang et. al. (Wang, W-J., Zhu, S., Macromolecules 33 (2000), 1157). Equations used for absolute propylene content were not modified.

The mole percent comonomer incorporation was calculated from the mole fraction:

$$E[\text{mol \%}]=100*fE$$

The weight percent comonomer incorporation was calculated from the mole fraction:

$$E[\text{wt \%}]=100*(fE*28.06)/((fE*28.06)+((1-fE)*42.08))$$

The comonomer sequence distribution at the triad level was determined using the analysis method of Kakugo et al. (Kakugo, M., Naito, Y., Mizunuma, K., Miyatake, T. Macromolecules 15 (1982) 1150). This method was chosen for its robust nature and integration regions slightly adjusted to increase applicability to a wider range of comonomer contents.

Number Average Molecular Weight ($M_n$), Weight Average Molecular Weight ($M_w$) and Molecular Weight Distribution (MWD)

Molecular weight averages (Mw, Mn), and the molecular weight distribution (MWD), i.e. the Mw/Mn (wherein Mn is the number average molecular weight and Mw is the weight average molecular weight), were determined by Gel Permeation Chromatography (GPC) according to ISO 16014-4: 2003 and ASTM D 6474-99. A PolymerChar GPC instrument, equipped with infrared (IR) detector was used with 3× Olexis and 1x Olexis Guard columns from Polymer Laboratories and 1,2,4-trichlorobenzene (TCB, stabilized with 250 mg/L 2,6-Di tert butyl-4-methyl-phenol) as solvent at 160° C. and at a constant flow rate of 1 mL/min. 200µï. of sample solution were injected per analysis. The column set was calibrated using universal calibration (according to ISO 16014-2:2003) with at least 15 narrow MWD polystyrene (PS) standards in the range of 0.5 kg/mol to 11 500 kg/mol. Mark Houwink constants for PS, PE and PP used are as described per ASTM D 6474-99. All samples were prepared by dissolving 5.0-9.0 mg of polymer in 8 mL (at 160° C.) of stabilized TCB (same as mobile phase) for 2.5 hours for PP or 3 hours for PE at max. 160° C. under continuous gentle shaking in the autosampler of the GPC instrument.

DSC analysis, melting temperature ($T_m$) and heat of fusion ($H_f$), crystallization temperature ($T_c$) and melt enthalpy (Hm): measured with a TA Instrument Q200 differential scanning calorimetry (DSC) on 5 to 7 mg samples. DSC is run according to ISO 11357/part 3/method C2 in a heat/cool/heat cycle with a scan rate of 10° C./min in the temperature range of −30 to +225° C. The crystallization temperature ($T_c$) is determined from the cooling step, while melting temperature ($T_m$) and melting enthalpy ($H_m$) are determined from the second heating step. The crystallinity is calculated from the melting enthalpy by assuming an Hm-value of 209 J/g for a fully crystalline polypropylene (see Brandrup, J., Immergut, E. H., Eds. Polymer Handbook, 3rd ed. Wiley, New York, 1989; Chapter 3).

The glass transition temperature Tg is determined by dynamic mechanical analysis according to ISO 6721-7. The measurements are done in torsion mode on compression moulded samples (40×10×1 mm³) between −100° C. and +150° C. with a heating rate of 2° C./min and a frequency of 1 Hz.

Comonomer content in elastomer (E) was measured in a known manner based on Fourier transform infrared spectroscopy (FTIR) calibrated with $^{13}$C-NMR, using Nicolet Magna 550 IR spectrometer together with Nicolet Omnic FTIR software. Films having a thickness of about 250 µm were compression molded from the samples. Similar films were made from calibration samples having a known content of the comonomer. The comonomer content was determined from the spectrum from the wave number range of from 1430 to 1100 cm$^{-1}$. The absorbance is measured as the height of the peak by selecting the so-called short or long base line or both. The short base line is drawn in about 1410-1320 cm$^{-1}$ through the minimum points and the long base line about between 1410 and 1220 cm$^{-1}$. Calibrations need to be done specifically for each base line type. Also, the comonomer content of the unknown sample needs to be within the range of the comonomer contents of the calibration samples.

Ash content is measured according to ISO 3451-1 (1997) standard.

Density is measured according to ISO 1183-187. Sample preparation is done by compression moulding in accordance with ISO 1872-2:2007.

Charpy notched and unnotched impact strength is determined according to ISO 179-1/1 eA and ISO 179-1/1 eU at 23° C. by using injection moulded test specimens as described in ISO 19069-2 (80×10×4 mm).

Tensile properties were determined on injection molded dogbone specimens prepared in accordance with ISO 19069-2. Tensile modulus was determined according to ISO 527-1A at 1 mm/min. and 23° C. To determine stress at yield and strain at yield, a speed of 50 mm/min. was used.

Instrumented failing weight test: Puncture energy, maximum force and puncture deflection was determined in the instrumented falling weight test according to ISO 6603-2 using injection moulded plaques of 60×60×3 mm in accordance with ISO 19069-2 and a test speed of 4.4 m/s. The reported puncture energy results from an integral of the failure energy curve measured at +23° C. and −30° C.

Average fiber diameter is determined according to ISO 1888:2006(E), Method B, microscope magnification of 1000.

2. Examples

The following inventive examples IE1 to IE5 and comparative examples CE1 and CE2 were prepared by compounding on a co-rotating twin-screw extruder (ZSK 40 from Coperion) with an ID ratio of 43. The following process parameters were used:
 throughput of 100 kg/h
 screw speed of 100-150 rpm
 barrel temperatures of 220-250° C. increasing from the feeding zone and decreasing again towards the die plate
 die plate with 4 mm diameter holes and 3 strands The polymer and the additives different from the short fibers were fed to the extruder and melt-kneaded in the $2^{nd}$ barrel. A first kneading zone for mixing the polymer and the additives is located between the 3$^{rd}$ and 5$^{th}$ barrel. The short fibers were added in the 6$^{th}$ barrel using a side feeder. A second kneading zone for glass fiber dispersion is located between the 7$^{th}$ and 12$^{th}$ barrel.

The composition and properties are summarized in Table 1.

AD is a composition comprising 1 part by weight of tris (2,4-di-t-butylphenyl) phosphite (Kinox-68-G by HPL Additives) and 2 parts by weight of pentaerythrityl-tetrakis(3-(3',5'-di-tert. butyl-4-hydroxyphenyl)-propionate (Irganox 1010FF by BASF)

TABLE 1

Composition and properties of the inventive and comparative examples

| | | CE1 | CE2 | IE1 | IE2 | IE3 | IE4 | IE5 |
|---|---|---|---|---|---|---|---|---|
| PP1 | [wt.-%] | 10.0 | 6.7 | 8.9 | 9.4 | 8.9 | 8.3 | 7.8 |
| PP2 | [wt.-%] | 25.0 | 16.6 | 22.2 | 23.7 | 22.2 | 20.9 | 19.4 |
| PP3 | [wt.-%] | 10.0 | 6.7 | 8.9 | 9.4 | 8.9 | 8.3 | 7.8 |
| E | [wt.-%] | - | 15.0 | 5.0 | 2.5 | 5.0 | 7.5 | 10.0 |
| SF | [wt.-%] | 50.0 | 50.0 | 50.0 | 50.0 | 50.0 | 50.0 | 50.0 |
| AP | [wt.-%] | 2.0 | 2.0 | 2.0 | 2.0 | 2.0 | 2.0 | 2.0 |
| Pigment | [wt.-%] | 1.0 | 1.0 | 1.0 | 1.0 | 1.0 | 1.0 | 1.0 |
| AD | [wt.-%] | 2.0 | 2.0 | 2.0 | 2.0 | 2.0 | 2.0 | 2.0 |
| Ash content | [wt.-%] | 49.9 | 50.9 | 49.1 | 49.4 | 49.8 | 49.6 | 49.8 |
| MFR | [g/10 min] | 2.81 | 4.04 | 3.04 | 2.14 | 2.45 | 2.33 | 2.29 |
| Tensile Modulus | [MPa] | 13016 | 10097 | 12275 | 12608 | 12210 | 11820 | 11350 |
| Tensile Strength | [MPa] | 147.27 | 97.84 | 141.60 | 154.94 | 145.19 | 137.17 | 127.06 |
| Tensile Strain at Tensile Strength | [%] | 2.16 | 2.41 | 2.32 | 2.29 | 2.46 | 2.62 | 2.70 |
| Tensile Stress at Break | [MPa] | 147.27 | 97.70 | 141.38 | 154.94 | 145.14 | 136.92 | 126.77 |
| Tensile Strain at Break | [%] | 2.16 | 2.44 | 2.33 | 2.29 | 2.45 | 2.57 | 2.60 |
| Charpy notched impact strength (23° C.) | [kJ/m$^2$] | 12.72 | 16.81 | 16.86 | 12.59 | 14.10 | 13.56 | 14.37 |
| Charpy unnotched impact strength (23° C.) | [kJ/m$^2$] | 62.58 | 55.41 | 63.16 | 60.37 | 63.38 | 61.55 | 60.01 |
| Maximum Force | [N] | 1789 | 1681 | 1955 | 2102 | 2072 | 2186 | 2039 |
| Deflection at Maximum Force | [mm] | 4.91 | 5.71 | 6.17 | 4.79 | 4.73 | 5.42 | 5.04 |
| Energy to Maximum Force | [J] | 5.58 | 6.39 | 8.02 | 6.23 | 6.15 | 7.57 | 6.43 |
| Puncture Deflection | [mm] | 5.76 | 7.70 | 7.35 | 5.62 | 6.02 | 6.49 | 6.53 |
| Puncture Energy | [J] | 6.78 | 9.10 | 9.91 | 7.67 | 8.40 | 9.60 | 8.91 |

PH1 is the commerical high flow propylene homopolymer HL504FB of *Borealis* AG having a melt flow rate MFR$_2$ (230° C.) of 450 g/10 min and a glass transition temperature Tg of +0° C.

PP2 is the comimerical propylene homopolymer HJ2UB of *Borealis* AG having a melt flow rate MFR$_2$ (230° C.) of 75 g/10 min, a density of 905 kg/m$^3$ and a glass transition temperature Tg of +2° C.

PP3 is the commercial propylene homopolymer HF955MO of *Borealis* AG having a melt flow rate MFR$_2$ (230° C.) of 20 g/10 min, a density of 908 kg/m$^3$ and a glass transition temperature Tg of +4° C. The propylene homopolymer HF955MO is α-nucleated with polyvinyl cyclohexane (polyVCH).

E is the commercial ethylene-octene copolymer Queo8230 by *Borealis* having a density of 0.882 g/cm$^3$, a melt flow rate MFR$_2$ (190° C.) of 30.0 g/10 min and an 1-octene content of 7.5 mol-%.

SF is the commercial product ECS 03 T-480H of Nippon Electric Glass Co., Ltd. having a filament diameter of 10.5 μm and a strand length of 3 mm.

AP is the adhesion promoter SCONA TPPP 9012 GA by Scona being a polypropylene functionalized with maleic anhydride having a maleic anhydride content of 1.4 wt.-% and a MFR (190° C.) above 50 g/10 min.

Pigment is a masterbatch comprising 1 wt.-% Remafin Schwarz P-AP (MP 99-BLACK 7-PP-30) by Clariant.

As can be gathered from Table 1, the composition according to comparative example CE2 containing 15.0 wt.-% of the elastomeric compound is featured by a high puncture energy and, therefore, excellent impact properties, but the tensile modulus decreases significantly compared to CE1 which contains the same amount of fibers, but no elastomeric compound. The compositions according to inventive examples IE1 to IE5 containing 2.5 to 10.0 wt.-% of the elastomeric compound also show high puncture energies, but the tensile modulus remains on a high level. Thus, a good balance between stiffness and impact behavior is achieved.

The invention claimed is:

1. Granules comprising a fiber reinforced composition (C), comprising:
   i) 20.0 to 70.0 wt. % of a propylene polymer (PP) having a melt flow rate MFR$_2$ (230° C., 2.16 kg) determined according to ISO 1133 in the range of 50 to 150 g/10 min,
   ii) 2.0 to 12.0 wt. % of an elastomeric ethylene copolymer (E) being a copolymer of ethylene and a C$_4$-C$_{10}$ α-olefin,
   iii) 0.1 to 5.0 wt. % of an adhesion promoter (AP), and
   iv) 10.0 to 70.0 wt. % of short glass fibers (SF) having an average length of 1.0 to 10.0 mm, based on the overall weight of the fiber reinforced composition (C), and wherein said fiber reinforced composition (C) fulfils in-equation (I)

$$\frac{w(PP)}{w(E)} > 2.0, \qquad (I)$$

wherein w(PP) is the weight fraction [in wt. %] of the propylene polymer (PP), based on the overall weight of the polypropylene composition (C), and w(E) is the weight fraction [in wt. %] of the elastomeric ethylene copolymer (E), based on the overall weight of the fiber reinforced composition (C), and wherein the polypropylene composition (C) has a tensile modulus determined according to ISO 527 of at least 8000 MPa.

2. The granules according to claim 1, wherein the fiber reinforced composition (C) fulfils in-equation (II):

$$\frac{w(SF)}{w(E)} > 3.3, \qquad (II)$$

wherein w(SF) is the weight fraction [in wt. %] of the short glass fibers (SF), based on the overall weight of the polypropylene composition (C), and w(E) is the weight fraction [in wt.-%] of the elastomeric ethylene copolymer (E), based on the overall weight of the fiber reinforced composition (C).

3. The granules according to claim 1, wherein the fiber reinforced composition (C) has a melt flow rate $MFR_2$ (230° C., 2.16 kg) determined according to ISO 1133 below 100.0 g/10 min.

4. The granules according to claim 1, wherein the adhesion promoter (AP) is a polar modified polypropylene (PM-PP) being a propylene homo- or copolymer grafted with maleic anhydride having a melt flow rate MFR (190° C., 2.16 kg) determined according to ISO 1133 of at least 50.0 g/10 min.

5. The granules according to claim 1, wherein the elastomeric ethylene copolymer (E) has a melt flow rate MFR (190° C., 2.16 kg) determined according to ISO 1133 of at least 25.0g/10 min.

6. The granules according to claim 1, wherein the elastomeric ethylene copolymer (E) has one or more of:
   a) a comonomer content of 2.0 to 25.0 mol %, and
   b) a density below 0.900 $g/cm^3$.

7. The granules according to claim 1, wherein the elastomeric ethylene copolymer (E) is a copolymer of ethylene and 1-octene.

8. The granules according to claim 1, wherein the propylene polymer (PP) is a propylene homopolymer.

9. The granules according to claim 1, wherein the propylene polymer (PP) is at least bimodal.

10. The granules according to claim 1, wherein the propylene polymer (PP) comprises:
    i) 10.0 to 35.0 wt. % of a first propylene polymer (PP1),
    ii) 30.0 to 70.0 wt. % of a second propylene polymer (PP2), and
    iii) 10.0 to 35.0 wt. % of a third propylene polymer (PP3), based on the overall weight of the propylene polymer (PP), wherein said first propylene polymer (PP1), said second propylene polymer (PP2) and said third propylene polymer (PP3) have different melt flow rates $MFR_2$ (230° C., 2.16 kg) determined according to ISO 1133.

11. The granules according to claim 1, wherein the short glass fibers (SF) have an average diameter of 8 to 20 µm.

12. The granules according to claim 1, comprising at least 80.0 wt. % of the fiber reinforced polypropylene composition (C), based on the overall weight of the granules.

13. The granules according to claim 1, wherein the polypropylene composition (C) has a tensile modulus determined according to ISO 527 of at least 10 000 MPa.

14. An article comprising the fiber reinforced polypropylene composition (C) according to claim 1.

* * * * *